US012591509B2

(12) United States Patent
Dutta

(10) Patent No.: US 12,591,509 B2
(45) Date of Patent: Mar. 31, 2026

(54) RECONFIGURABLE PARTITIONING OF HIGH BANDWIDTH MEMORY

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 62 days.

(21) Appl. No.: 18/634,147

(22) Filed: Apr. 12, 2024

(65) Prior Publication Data

US 2025/0321878 A1      Oct. 16, 2025

(51) Int. Cl.
*G06F 12/02* (2006.01)
*G06F 13/16* (2006.01)
(52) U.S. Cl.
CPC ........ *G06F 12/023* (2013.01); *G06F 13/1663* (2013.01); *G06F 13/1678* (2013.01)
(58) Field of Classification Search
CPC . G06F 12/023; G06F 13/1678; G06F 13/1663
See application file for complete search history.

(56) References Cited

U.S. PATENT DOCUMENTS

2018/0024935 A1* 1/2018 Meswani ............ G06F 12/0893
                                                          711/145
2021/0373811 A1* 12/2021 Vogelsang .......... G11C 11/4093

2022/0309011 A1* 9/2022 Nagarajan ........... G06F 13/4022
2022/0337923 A1 10/2022 Gupta et al.
2023/0004303 A1* 1/2023 Yang ................... G06F 12/0246
2023/0058989 A1* 2/2023 Hammarlund ...... G06F 12/0811

OTHER PUBLICATIONS

Zhang et al., "MEG: A RISCV-based System Emulation Infrastructure for Near-data Processing Using FPGAs and High-bandwidth Memory," ACM Transactions on Reconfigurable Technology and Systems, vol. 13, No. 4, dated Sep. 30, 2020, 24 pages.
EP Search Report, Application No. 25169701.7-1207, dated Jul. 29, 2025, 10 pages.

* cited by examiner

*Primary Examiner* — Michael Krofcheck

(74) *Attorney, Agent, or Firm* — Tong, Rea, Bentley & Kim, LLC

(57) ABSTRACT

Various example embodiments of a capability for supporting reconfigurable partitioning of high bandwidth memory (HBM) in a multi-processor computing system are presented. The capability for supporting reconfigurable partitioning of HBM in a multi-processor computing system, where the multi-processor computing system includes a multi-processor system-on-chip (SoC) including a set of processors supporting respective sets of processor memory channels and an HBM interconnected via an HBM bus supporting a set of HBM bus channels, may support dynamic mapping of the processor memory channels of the processors of the multi-processor SoC to the HBM bus channels of the HBM, thereby overcoming various limitations of a static mapping of the processor memory channels of the processors of the multi-processor SoC to the HBM bus channels of the HBM. The dynamic processor-to-HBM channel mappings enable mapping of any of the processor memory channels of the processors of the multi-processor SoC to any of the HBM bus channels of the HBM.

8 Claims, 11 Drawing Sheets

START 501

SELECT FIRST PROCESSOR CORE OF MULTI-PROCESSOR SYSTEM 510

DETERMINE NUMBER OF HBM BUS CHANNELS NEEDED BY PROCESSOR CORE 520

CONFIGURE HBM BUS SEGMENT BASED ON NUMBER OF HBM BUS CHANNELS NEEDED BY PROCESSOR CORE 530

SUCCESSFUL? 540

NO

DECLARE FAILURE 550

YES

MORE PROCESSOR CORES? 560

YES

SELECT NEXT PROCESSOR CORE 570

NO

END 599

600

START — 601

DETERMINE NUMBER OF HBM BUS CHANNELS NEEDED BY PROCESSOR CORE (NUM_CHANNELS) — 605

DETERMINE MAXIMUM NUMBER OF PROCESSOR MEMORY CHANNELS OF THE PROCESSOR CORE (MAX_CHANNELS) — 610

615

NUM_CHANNELS ≤ MAX_CHANNELS?

NO

YES

620 — P-SET = SELECT PROCESSOR MEMORY CHANNELS [0 THROUGH (NUM_CHANNELS – 1)]

625 — DETERMINE NUMBER OF AVAILABLE HBM BUS CHANNELS (AVAIL_HBM_CHANNELS)

TO BLOCK 630

TO BLOCK 650

*CON'T*

800

START — 801

INITIATE A NEW HBM BUS SEGMENT FOR PROCESSOR CORE — 810

SELECT FIRST HBM BUS CHANNEL (H-CHANNEL) IN SET OF HBM BUS CHANNELS (H-SET) — 820

PROGRAM SELECTED HBM BUS CHANNEL AS MEMBER OF HBM BUS SEGMENT — 830

MORE H-CHANNELS IN H-SET? — 840

YES

SELECT NEXT H-CHANNEL IN H-SET — 850

NO

END — 899

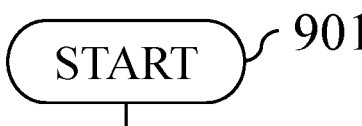

START — 901

DETERMINE, FOR A MULTI-PROCESSOR SYSTEM INCLUDING A PROCESSOR CORE AND A HIGH BANDWIDTH MEMORY SUPPORTING A HIGH BANDWIDTH MEMORY BUS HAVING A SET OF HIGH BANDWIDTH MEMORY BUS CHANNELS, A NUMBER OF THE HIGH BANDWIDTH MEMORY BUS CHANNELS TO BE USED BY THE PROCESSOR CORE — 910

CONFIGURE, BASED ON THE NUMBER OF THE HIGH BANDWIDTH MEMORY BUS CHANNELS TO BE USED BY THE PROCESSOR CORE, THE MULTI-PROCESSOR SYSTEM TO PROVIDE A HIGH BANDWIDTH MEMORY BUS SEGMENT FOR THE PROCESSOR CORE — 920

END — 999

RECONFIGURABLE PARTITIONING OF HIGH BANDWIDTH MEMORY

TECHNICAL FIELD

Various example embodiments relate generally to computing systems and, more particularly but not exclusively, to supporting use of high bandwidth memory in multi-processor computing systems.

BACKGROUND

Computing systems utilize various types of processors to perform various functions in various contexts.

SUMMARY

In at least some example embodiments, an apparatus includes a processing element, a high bandwidth memory, and a high bandwidth memory bus having a set of high bandwidth memory bus channels configured to support memory transactions between the processing element and the high bandwidth memory, wherein the processing element includes a set of processor cores and a first control element, wherein the processor cores support respective sets of processor memory channels, wherein the first control element is configurable to map the processor memory channels of the processor cores to the high bandwidth memory bus channels, and wherein the high bandwidth memory includes a set of memory elements and a second control element, wherein the memory elements support respective subsets of the high bandwidth memory bus channels, wherein the second control element is configurable to operate subsets of the high bandwidth memory bus channels as independent high bandwidth memory bus segments for the processor cores of the processing element. In at least some example embodiments, a number of the processor memory channels supported by the set of processor cores is greater than a number of high bandwidth memory bus channels of the high bandwidth memory bus. In at least some example embodiments, the first control element and the second control element are configurable to support, for each of the processor cores, mapping of a subset of the respective set of processor memory channels of the respective processor core to ones of the high bandwidth memory bus channels. In at least some example embodiments, the first control element and the second control element are configurable to support homogenous high bandwidth memory bus segments in which each of the processor cores utilizes an equal number of the high bandwidth memory bus channels. In at least some example embodiments, the first control element and the second control element are configurable to support heterogeneous high bandwidth memory bus segments in which at least two of the processor cores utilize different numbers of the high bandwidth memory bus channels. In at least some example embodiments, the first control element and the second control element are configurable to support reassignment of one of the high bandwidth memory bus channels from a first one of the processor cores to a second one of the processor cores. In at least some example embodiments, the first control element is communicatively connected to the second control element through a control channel. In at least some example embodiments, the first control element comprises a channel multiplexer configured to be programmed to cross-connect ones of the processor memory channels to ones of the high bandwidth memory bus channels. In at least some example embodiments, the second control element comprises a segment multiplexer configured to be programmed to operate respective subsets of the high bandwidth memory bus channels as respective independent high bandwidth memory bus segments for respective ones of the processor cores. In at least some example embodiments, the processing element is configured to determine, for one of the processor cores, a number of the high bandwidth memory bus channels to be used by the one of the processor cores, and configure, based on the number of the high bandwidth memory bus channels to be used by the processor core, the multi-processor system to provide a high bandwidth memory bus segment for the processor core. In at least some example embodiments, an apparatus includes at least one processor and at least one memory storing instructions which, when executed by the at least one processor, cause the apparatus at least to determine, for a multi-processor system including a processor core and a high bandwidth memory supporting a high bandwidth memory bus having a set of high bandwidth memory bus channels, a number of the high bandwidth memory bus channels to be used by the processor core, and configure, based on the number of the high bandwidth memory bus channels to be used by the processor core, the multi-processor system to provide a high bandwidth memory bus segment for the processor core. In at least some example embodiments, to configure the multi-processor system to provide the high bandwidth memory bus segment for the processor core, the instructions, when executed by the at least one processor, cause the apparatus at least to determine, from a set of processor memory channels of the processor core based on the number of high bandwidth memory bus channels to be used by the processor core, a set of selected processor memory channels of the processor core, determine, from the set of high bandwidth memory bus channels, a set of selected high bandwidth memory bus channels selected for the processor core, and configure the multi-processor system to support use of the set of selected high bandwidth memory bus channels selected for the processor core by the set of selected processor memory channels of the processor core. In at least some example embodiments, to configure the multi-processor system to support use of the set of selected high bandwidth memory bus channels selected for the processor core by the set of selected processor memory channels of the processor core, the instructions, when executed by the at least one processor, cause the apparatus at least to configure a first element to support a mapping of the set of selected processor memory channels of the processor core to the set of selected high bandwidth memory bus channels, and configure a second element to operate the set of selected high bandwidth memory bus channels as an independent high bandwidth memory bus segment for the processor core. In at least some example embodiments, to configure the first element to support the mapping of the set of selected processor memory channels of the processor core to the set of selected high bandwidth memory bus channels, the instructions, when executed by the at least one processor, cause the apparatus at least to configure the first element to cross-connect, respectively, the selected processor memory channels of the processor core and the selected high bandwidth memory bus channels. In at least some example embodiments, to configure the second element to operate the set of selected high bandwidth memory bus channels as the independent high bandwidth memory bus segment for the processor core, the instructions, when executed by the at least one processor, cause the apparatus at least to instantiate, at the second element, the independent high bandwidth memory bus segment for the processor core, and configure, at the second element, the selected high bandwidth memory bus channels as members of the independent high bandwidth memory bus segment for the processor core.

In at least some example embodiments, a non-transitory computer readable medium stores computer program instructions which, when executed by an apparatus, cause the apparatus to determine, for a multi-processor system including a processor core and a high bandwidth memory supporting a high bandwidth memory bus having a set of high bandwidth memory bus channels, a number of the high bandwidth memory bus channels to be used by the processor core, and configure, based on the number of the high bandwidth memory bus channels to be used by the processor core, the multi-processor system to provide a high bandwidth memory bus segment for the processor core. In at least some example embodiments, to configure the multi-processor system to provide the high bandwidth memory bus segment for the processor core, the computer program instructions, when executed by the apparatus, cause the apparatus at least to determine, from a set of processor memory channels of the processor core based on the number of high bandwidth memory bus channels to be used by the processor core, a set of selected processor memory channels of the processor core, determine, from the set of high bandwidth memory bus channels, a set of selected high bandwidth memory bus channels selected for the processor core, and configure the multi-processor system to support use of the set of selected high bandwidth memory bus channels selected for the processor core by the set of selected processor memory channels of the processor core. In at least some example embodiments, to configure the multi-processor system to support use of the set of selected high bandwidth memory bus channels selected for the processor core by the set of selected processor memory channels of the processor core, the computer program instructions, when executed by the apparatus, cause the apparatus at least to configure a first element to support a mapping of the set of selected processor memory channels of the processor core to the set of selected high bandwidth memory bus channels, and configure a second element to operate the set of selected high bandwidth memory bus channels as an independent high bandwidth memory bus segment for the processor core. In at least some example embodiments, to configure the first element to support the mapping of the set of selected processor memory channels of the processor core to the set of selected high bandwidth memory bus channels, the computer program instructions, when executed by the apparatus, cause the apparatus at least to configure the first element to cross-connect, respectively, the selected processor memory channels of the processor core and the selected high bandwidth memory bus channels. In at least some example embodiments, to configure the second element to operate the set of selected high bandwidth memory bus channels as the independent high bandwidth memory bus segment for the processor core, the computer program instructions, when executed by the apparatus, cause the apparatus at least to instantiate, at the second element, the independent high bandwidth memory bus segment for the processor core, and configure, at the second element, the selected high bandwidth memory bus channels as members of the independent high bandwidth memory bus segment for the processor core.

In at least some example embodiments, a method includes determining, for a multi-processor system including a processor core and a high bandwidth memory supporting a high bandwidth memory bus having a set of high bandwidth memory bus channels, a number of the high bandwidth memory bus channels to be used by the processor core, and configuring, based on the number of the high bandwidth memory bus channels to be used by the processor core, the multi-processor system to provide a high bandwidth memory bus segment for the processor core. In at least some example embodiments, configuring the multi-processor system to provide the high bandwidth memory bus segment for the processor core includes determining, from a set of processor memory channels of the processor core based on the number of high bandwidth memory bus channels to be used by the processor core, a set of selected processor memory channels of the processor core, determining, from the set of high bandwidth memory bus channels, a set of selected high bandwidth memory bus channels selected for the processor core, and configuring the multi-processor system to support use of the set of selected high bandwidth memory bus channels selected for the processor core by the set of selected processor memory channels of the processor core. In at least some example embodiments, configuring the multi-processor system to support use of the set of selected high bandwidth memory bus channels selected for the processor core by the set of selected processor memory channels of the processor core includes configuring a first element to support a mapping of the set of selected processor memory channels of the processor core to the set of selected high bandwidth memory bus channels, and configuring a second element to operate the set of selected high bandwidth memory bus channels as an independent high bandwidth memory bus segment for the processor core. In at least some example embodiments, configuring the first element to support the mapping of the set of selected processor memory channels of the processor core to the set of selected high bandwidth memory bus channels includes configuring the first element to cross-connect, respectively, the selected processor memory channels of the processor core and the selected high bandwidth memory bus channels. In at least some example embodiments, configuring the second element to operate the set of selected high bandwidth memory bus channels as the independent high bandwidth memory bus segment for the processor core includes instantiating, at the second element, the independent high bandwidth memory bus segment for the processor core, and configuring, at the second element, the selected high bandwidth memory bus channels as members of the independent high bandwidth memory bus segment for the processor core.

In at least some example embodiments, an apparatus includes means for determining, for a multi-processor system including a processor core and a high bandwidth memory supporting a high bandwidth memory bus having a set of high bandwidth memory bus channels, a number of the high bandwidth memory bus channels to be used by the processor core, and means for configuring, based on the number of the high bandwidth memory bus channels to be used by the processor core, the multi-processor system to provide a high bandwidth memory bus segment for the processor core. In at least some example embodiments, the means for configuring the multi-processor system to provide the high bandwidth memory bus segment for the processor core includes means for determining, from a set of processor memory channels of the processor core based on the number of high bandwidth memory bus channels to be used by the processor core, a set of selected processor memory channels of the processor core, means for determining, from the set of high bandwidth memory bus channels, a set of selected high bandwidth memory bus channels selected for the processor core, and means for configuring the multi-processor system to support use of the set of selected high bandwidth memory bus channels selected for the processor core by the set of selected processor memory channels of the processor core. In at least some example embodiments, the means for configuring the multi-processor system to support use of the set of selected high bandwidth memory bus channels selected for the processor core by the set of selected processor memory channels of the processor core includes means for configuring a first element to support a mapping of the set of selected processor memory channels of the processor core to the set of selected high bandwidth memory bus channels, and means for configuring a second element to operate the set of selected high bandwidth memory bus channels as an independent high bandwidth memory bus segment for the processor core. In at least some example embodiments, the means for configuring the first element to support the mapping of the set of selected processor memory channels of the processor core to the set of selected high bandwidth memory bus channels includes means for configuring the first element to cross-connect, respectively, the selected processor memory channels of the processor core and the selected high bandwidth memory bus channels. In at least some example embodiments, the means for configuring the second element to operate the set of selected high bandwidth memory bus channels as the independent high bandwidth memory bus segment for the processor core includes means for instantiating, at the second element, the independent high bandwidth memory bus segment for the processor core, and means for configuring, at the second element, the selected high bandwidth memory bus channels as members of the independent high bandwidth memory bus segment for the processor core.

In at least some example embodiments, an apparatus includes a processing element including a set of processor cores and a control element and also includes a high bandwidth memory including a set of memory elements and a control element, wherein each of the processor cores is configured to support a respective set of processor memory channels configured to support memory transactions with a high bandwidth memory via a high bandwidth memory bus supporting a set of high bandwidth memory bus channels, wherein the control element is configured to be programmed to support mapping of ones of the processor memory channels of the processor cores to ones of the high bandwidth memory bus channels of the high bandwidth memory bus, wherein the set of memory elements is configured to support memory transactions of a set of processor cores of a processing element via a high bandwidth memory bus supporting a set of high bandwidth memory bus channels, wherein the control element is configured to be programmed to control operation of subsets of the high bandwidth memory bus channels of the high bandwidth memory bus as respective independent high bandwidth memory bus segments for the respective processor cores of the processing element. In at least some example embodiments, an apparatus includes a processing element including a set of processor cores and a control element, wherein each of the processor cores is configured to support a respective set of processor memory channels configured to support memory transactions with a high bandwidth memory via a high bandwidth memory bus supporting a set of high bandwidth memory bus channels, and wherein the control element is configured to be programmed to support mapping of ones of the processor memory channels of the processor cores to ones of the high bandwidth memory bus channels of the high bandwidth memory bus. In at least some example embodiments, an apparatus includes a high bandwidth memory including a set of memory elements and a control element, wherein the set of memory elements is configured to support memory transactions of a set of processor cores of a processing element via a high bandwidth memory bus supporting a set of high bandwidth memory bus channels, and wherein the control element is configured to be programmed to control operation of subsets of the high bandwidth memory bus channels of the high bandwidth memory bus as respective independent high bandwidth memory bus segments for the respective processor cores of the processing element.

BRIEF DESCRIPTION OF THE DRAWINGS

The teachings herein can be readily understood by considering the following detailed description in conjunction with the accompanying drawings, in which:

FIG. 2 depicts an example embodiment of the multi-processor system of FIG. 1 where the multi-processor system includes specific programmable elements which may be configured to support reconfigurable partitioning of HBM to provide independent HBM bus segments for processor cores of the multi-processor SoC;

FIG. 9 depicts an example embodiment of a method for use by a multi-processor system for dynamic configuration of HBM bus segments for processor cores of the multi-processor system.

To facilitate understanding, identical reference numerals have been used herein, wherever possible, in order to designate identical elements that are common among the various figures.

DETAILED DESCRIPTION

Figure 1:
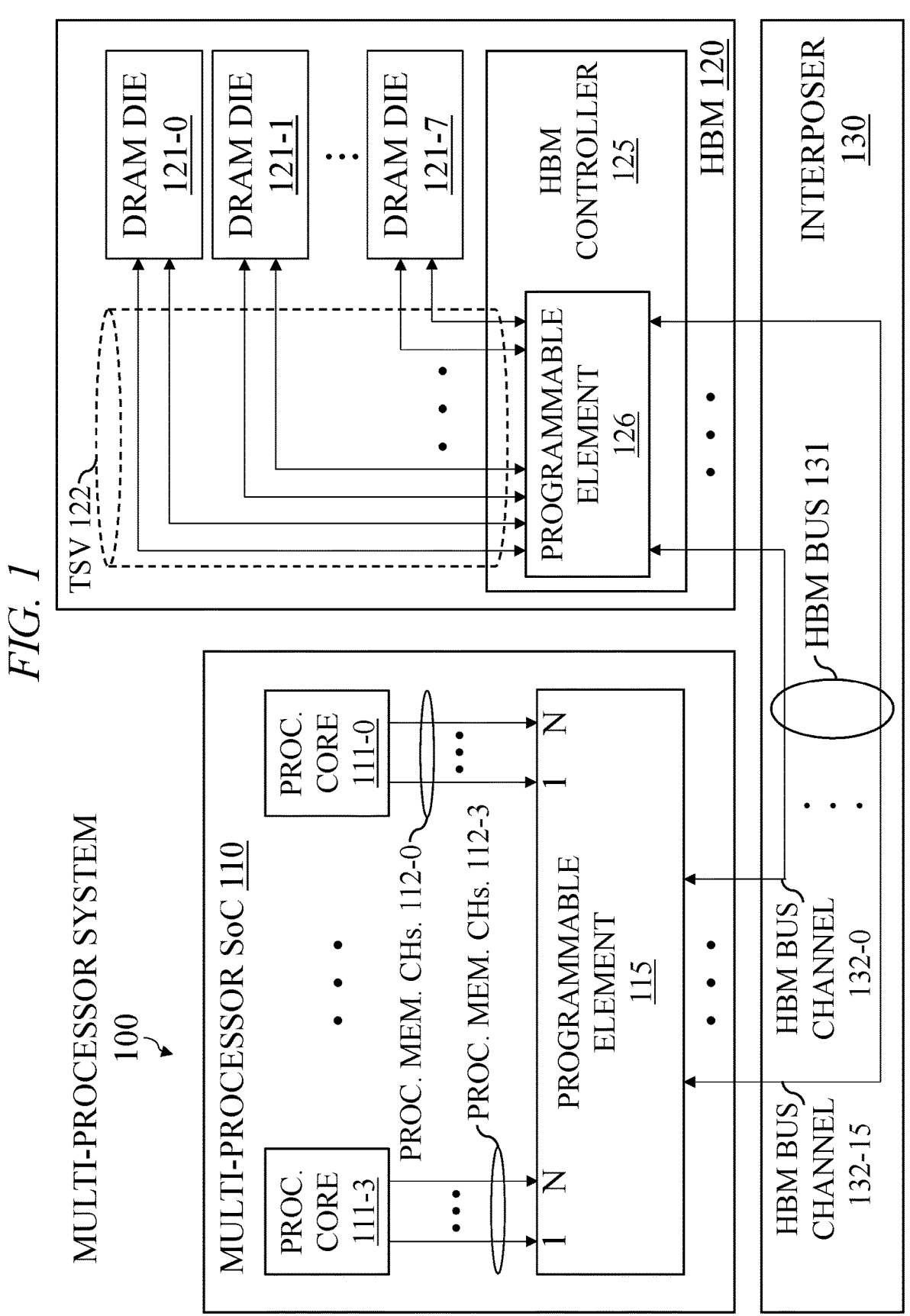
FIG. 1 depicts an example embodiment of a multi-processor system including a multi-processor system-on-chip (SoC) including a set of processor cores, a high bandwidth memory (HBM) including a set of memory elements, and an HBM bus including a set of HBM bus channels configured to support memory transactions between the multi-processor SoC and the HBM.

Various example embodiments of a capability for supporting reconfigurable partitioning of high bandwidth memory (HBM) in a multi-processor computing system are presented. The capability for supporting reconfigurable partitioning of HBM in a multi-processor computing system, where the multi-processor computing system includes a multi-processor system-on-chip (SoC) including a set of processors supporting respective sets of processor memory channels and an HBM interconnected via an HBM bus supporting a set of HBM bus channels, may be configured to support dynamic mapping of the processor memory channels of the processors of the multi-processor SoC to the HBM bus channels of the HBM, thereby overcoming various limitations of a static mapping of the processor memory channels of the processors of the multi-processor SoC to the HBM bus channels of the HBM (i.e., a static mapping in which the processor memory channels of the processors of the multi-processor SoC and the HBM bus channels of the HBM are hardwired to each other). The dynamic processor-to-HBM channel mappings enable mapping of any of the processor memory channels of the processors of the multi-processor SoC to any of the HBM bus channels of the HBM. The dynamic processor-to-HBM channel mappings may be supported based on use of a channel multiplexer (CMUX) on the SoC and a segment multiplexer (SMUX) on an HBM controller of the HBM, where the CMUX is configured to dynamically control mapping of processor memory channels of the processors of the multi-processor SoC to HBM bus channels of the HBM and the SMUX is configured to operate subsets of the HBM bus channels as independent HBM bus segments for the HBM based on the mapping of the processor memory channels of the processors of the multi-processor SoC to HBM bus channels of the HBM. The processor-to-HBM channel mappings may be programmatically reconfigured dynamically by a processor based on software and/or firmware. The multi-processor computing system supporting reconfigurable partitioning of HBM may be a central processing unit (CPU) where each processor is a processor core of the CPU (or a portion of a CPU, such as where the reconfigurable partitioning of the HBM is applied to a subset of the cores of the CPU), a graphics processing unit (GPU) where each processor is a processor core of the GPU (or a portion of a GPU, such as where the reconfigurable partitioning of the HBM is applied to a subset of the cores of the GPU), a network processing unit (NPU) that processes and forwards packets in a routing system (or a portion of an NPU, such as where the reconfigurable partitioning of the HBM is applied to a subset of the cores of the NPU), or the like. The multi-processor computing system supporting reconfigurable partitioning of HBM may be utilized to provide any high performance computing system which may utilize HBM, such as a server, a router, a supercomputer, or the like. It will be appreciated that these and various other example embodiments of the capability for supporting reconfigurable partitioning of HBM in multi-processor computing systems may be further understood by way of reference to the various figures, which are discussed further below.

FIG. 1 depicts an example embodiment of a multi-processor system including a multi-processor system-onchip (SoC) including a set of processor cores, a high bandwidth memory (HBM) including a set of memory elements, and an HBM bus including a set of HBM bus channels configured to support memory transactions between the multi-processor SoC the HBM.

As illustrated in FIG. 1, a multi-processor system 100 includes a multi-processor system-on-chip (SoC) 110, a high bandwidth memory (HBM) 120, and an interposer 130 via which the multi-processor SoC 110 and the HBM 120 are connected. The multi-processor SoC 110 supports processing resources and the HBM 120 supports storage resources for storing data or other information for use by the processing resources of the multi-processor SoC 110. The interposer 130 provides a common substrate for the multi-processor SoC 110 and the HBM 120, and supports an HBM bus 131 which supports memory-based communications between the multi-processor SoC 110 and the HBM 120. The multi-processor system 100 is designed for independent parallel access by the processors of the multi-processor SoC 110 to the HBM 120 (e.g., for accessing data stored in the HBM 120). The multi-processor system 100 is configured to support various example embodiments of reconfigurable partitioning of the HBM 120 for supporting access to the HBM 120 by processors of the multi-processor SoC 110. It will be appreciated that various aspects of such example embodiments of reconfigurable partitioning of the HBM 120 for supporting access to the HBM 120 by processors of the multi-processor SoC 110 may be further understood by first considering various aspects of the various elements of the multi-processor system 100.

The multi-processor SoC 110 is a multi-processor system configured to support various processing functions, which may depend on the type of device in which the multi-processor system 100 is implemented. The multi-processor SoC 110 includes a set of four processor cores 111-0-111-3 (collectively, processor cores 111, which also are referred to herein as Proc-0 through Proc-3, respectively). The processor cores 111 are configured to support various processing functions, which may depend on the type of device in which the multi-processor system 100 is implemented. The processor cores 111 may be configured to access various types of information from the HBM 120 for use in performing such processing functions (e.g., program instructions for programs executed by the processor cores 111 to provide the processing functions, program reference data for use by the processor cores 111 to perform processing based on the processing functions, program output data output by the processor cores 111 based on the processing functions, or the like, as well as various combinations thereof). The processor cores 111 each support sets of N processor memory channels 112 (illustratively, processor core 111-0 supports a set of N processor memory channels 112-0 and so forth, with processor core 111-3 supporting a set of N processor memory channels 112-3). It will be appreciated that the multi-processor SoC 110, although primarily presented as including a specific number of processor cores 111 (presented in this manner for purposes of clarity in describing various aspects of example embodiments of reconfigurable partitioning of the HBM 120), may include fewer or more processor cores 111. The multi-processor SoC 110 also includes a programmable element 115 (which, as illustrated with respect to FIG. 2, may be implemented as a channel multiplexer (CMUX)) that is configured to support various example embodiments of reconfigurable partitioning of the HBM 120.

The HBM 120 is a high bandwidth memory, which is a type of random access memory (RAM) that vertically stacks multiple dynamic random access memory (DRAM) chips (or dies), which are often referred to as three-dimensional (3D) stacked DRAMs. The vertically stacked DRAM dies are typically interconnected by vertical interconnection technology referred to as Through Silicon Via (TSV). The vertical stacking of the DRAM chips in an HBM shortens the information commute (since each of the DRAM chips is horizontally equidistant from associated processor cores that will access the DRAM at the expense of relatively small additional vertical distance for the DRAM chips located higher up on the DRAM stack) and allows smaller form factors and lower power consumption. It will be appreciated that, although omitted for purposes of clarity, each DRAM die may include a set of DRAM banks which may be organized in various ways (e.g., into pools of DRAM banks with each pool of DRAM banks providing a logical block of memory support a particular access channel size and total memory storage capability) in order to enable each DRAM die to support a particular amount of storage that is then accessible via a particular number of channels.

The HBM 120 includes a set of eight DRAM dies 121-0 through 121-7 (collectively, DRAM dies 121). It is noted that the DRAM dies 121 also may be referred to herein as DRAM chips. In the example of FIG. 1, it is assumed that each DRAM die 121 has 32 banks segregated into two pools to provide two pools of 16 banks each, where each pool of 16 banks is a logical block of memory and provides a 64-bit channel with a 1 gigabyte (GB) storage such that each DRAM die 121 provides two independent 64-bit channels for parallel access to the two pools of the DRAM die 121 and the DRAM die 121 supports 2 GB storage capacity. With this arrangement, since there are eight DRAM dies 121 vertically stacked within the HBM 120, the HBM 120 supports 16 GB of storage in total and sixteen 64-bit channels (1024 bits of access in total). The sixteen 64-bit channels connected to the eight DRAM dies 121 (illustratively, two 64-bit channels for each of the eight DRAM dies 121) are implemented as TSV 122. The HBM 120 also includes an HBM controller 125 that includes circuitry configured to control access to the DRAM dies 121 via the TSV 122 (i.e., via the sixteen 64-bit channels connected to the eight DRAM dies 121). The HBM controller 125 supports memory transactions by the processor cores 111 by translating memory addresses received from the processor cores 111 for memory transactions into specific rows and columns of DRAM banks in the DRAM dies 121 for access data from the DRAM dies 121. The HBM 120 also includes a programmable element 126 (which, as illustrated with respect to FIG. 2, may be implemented as a segment multiplexer (SMUX)) that is configured to support various example embodiments of reconfigurable partitioning of the HBM 120.

It will be appreciated that the HBM 120, although primarily presented as including a specific number of DRAM dies 121 supporting a specific total storage capacity accessible to the DRAM dies 121 based on a specific configuration of the DRAM dies 121 and a specific number of channels for accessing the DRAM dies 121 (presented in this manner for purposes of clarity in presenting various aspects of example embodiments of reconfigurable partitioning of the HBM 120), may include fewer or more DRAM dies 121, may support DRAM dies 121 having other configurations (e.g., in terms of number of DRAM banks, number of pools into which the DRAM banks are segregated, or the like, as well as various combinations thereof), may support less or more total storage capacity of the DRAM dies 121, may support less or more memory channels for accessing the DRAM dies 121, or the like, as well as various combinations thereof. It will be appreciated that the HBM 120 may be implemented in various other ways for storing data for use by processor cores 111 of the multi-processor SoC 110.

It is noted that the HBM 120 is configured such that, although being composed of DRAMs and having a smaller capacity than traditional DRAMs (e.g., up to 256 GB), the HBM 120 has a much higher bandwidth (e.g., at least sixteen times higher in the implementation of FIG. 1, since it supports 1024 bits as compared to 64 bits of traditional DRAMs) and a much higher memory bus speed (e.g., at least sixteen times faster in the implementation of FIG. 1 since it supports 1024 bits as compared to 64 bits of traditional DRAMs) than traditional DRAMs (especially in the case of FIG. 1 where the HBM 120 is packaged together with the multi-processor SoC 110 such that the length of the HBM bus 131 is relatively short and where the HBM bus 131 is implemented over the interposer 130 which provides the common substrate for the multi-processor SoC 110 and the HBM 120 and provides a faster interconnection for the HBM bus 131 between the multi-processor SoC 110 and the HBM 120).

The interposer 130 provides a common silicon substrate for the multi-processor SoC 110 and the HBM 120, and supports an HBM bus 131 that supports memory-based communications between the multi-processor SoC 110 and the HBM 120. The HBM bus 131 includes a set of HBM bus channels 132-0-132-15 (collectively, HBM bus channels 132). The HBM bus channels 132 provide channels for enabling the processor cores 111 to access the DRAM dies 121 of the HBM 120. As illustrated in FIG. 1, the sixteen HBM bus channels 132 of the HBM bus 131 correspond to the eight pairs of bus channels supported by the eight DRAM dies 121 of the HBM 120. In the example of FIG. 1, it is assumed that each of the HBM bus channels 132 is a 64-bit channel, such that the HBM bus 131 may be operated as a 1024-bit bus for access by the processor cores 111 to the HBM 120. It will be appreciated that, although primarily presented with respect to example embodiments in which the HBM bus channels 132 have a specific bandwidth (namely, 64-bit HBM bus channels 132), the HBM bus channels 132 of the HBM bus 131 may support smaller or larger bandwidths. It will be appreciated that, although primarily presented with respect to example embodiments in which the HBM bus 131 includes a specific number of HBM bus channels 132 (namely, sixteen HBM bus channels 132), the HBM bus 131 may include fewer or more HBM bus channels 132.

It will be appreciated that various example embodiments of reconfigurable partitioning of the HBM 120 may be further understood by considering operation of the HBM 120 without the example embodiments of reconfigurable partitioning of the HBM 120 (i.e., where the partitioning of the HBM 120 is static) and operation of the HBM 120 with example embodiments of reconfigurable partitioning of the HBM 120 (i.e., where the partitioning of the HBM 120 is reconfigurable).

Without example embodiments of reconfigurable partitioning of the HBM 120, partitioning of the HBM 120 would be static. The configuration of the multi-processor system 100 to provide HBM bus segments for the processor cores 111, including the mapping of the processor cores 111 to the HBM bus channels 132 of the HBM bus 131 and the operation of groups of HBM bus channels 132 of the HBM bus 131 as independent HBM bus segments for the processor cores 111 at the HBM 120, is static and independent of the needs of the processor cores 111 of the multi-processor SoC 110. In this case, since the HBM bus 131 includes sixteen HBM bus channels 132, each of the processor cores 111 would support four (i.e., N=4) processor memory channels 112 connected to four of the HBM bus channels 132, thereby forcing uniform access by the processor cores 111 to the HBM 120 irrespective of the needs of the processor cores 111. In other words, the sixteen 64-bit HBM bus channels would be 4:1 mapped to the processor cores 111 as follows: (1) Proc-0 memory channels 0-3=>HBM bus channels 0-3, Segment-0, DRAM dies 0-1, (2) Proc-1 memory channels 0-3=>HBM bus channels 4-7, Segment-1, DRAM dies 2-3, (3) Proc-2 memory channels 0-3=>HBM bus channels 8-11, Segment-3, DRAM dies 4-5, and (4) Proc-3 memory channels 0-3=>HBM bus channels 12-15, Segment-4, DRAM dies 6-7. With this arrangement, each of the processor cores 111 can independently do 256-bit (32B) memory transactions and has an exclusive 4 GB storage in the HBM 120 (i.e., this provides segmentation of the HBM 120 among the multiple processor cores 111 where each of the processor cores 111 has a 256-bit segment bus that connects to a 4 GB storage segment). This static configuration provides various benefits, but also may be problematic in certain situations. For example, consider an example in which the multi-processor SoC 110 is used as an NPU that performs packet processing and forwarding in a packet-based routing system, where the processor cores 111 are daisy-chained in a packet processing pipeline in which Proc-0 is the head-end of the packet processing pipeline and Proc-3 is the tail-end of the packet processing pipeline, and where each of the processor cores 111 performs its share of processing on the packet by looking up relevant states in various forwarding tables stored in its assigned HBM bus segment. For example, Proc-0 picks up the first packet in the queue, performs its share of processing by looking up the tables stored in DRAM dies 0-1 and then sends the packet to Proc-1. While Proc-1 is processing the first packet by looking up the tables stored in DRAM dies 2-3, Proc-0 picks up a second packet for processing, and so forth. Further, consider an example in which the maximum size of a table entry among all tables accessed by the processor cores 111 (meaning that a processor core 111 can issue a memory read up to that size) are as follows: Proc-0=>64B, Proc-1=>16B, Proc-2=>32B Proc-3=>16B. Then, assume that the number of processor cycles taken up by one memory read transaction on a 256-bit bus segment is T cycles. In that case, it will take 2T cycles for Proc-0 to complete reading a table entry of size 64B (2×256-bit), while Proc-1, Proc-2, and Proc-3 will each take T cycles to complete reading their table entries (it is noted that, although the maximum size of a table entry for Proc-1 and Proc-3 is 16B, each will read 32B and then discard the unwanted upper or lower 16B). Now, assume that processing a sequence of packets requires Nx64B reads by Proc-0 and Nx32B reads by Proc-1, Proc-2, and Proc-3. In that case, Proc-0 would spend 2TxN cycles in memory transactions, whereas Proc-1, Proc-2, and Proc-3 would spend TxN cycles in memory transactions. So, Proc-0 would run slower and consume more power. So, if the processor cores 111 were daisy-chained in a pipeline, a slower Proc-0 will slow down the entire pipeline, resulting in degradation of packet processing throughput. Even though each processor core will not do exactly N reads, a larger memory cycle (2T) introduced within Proc-0 will slow down rest of the processing in Proc-0 and, thus, the latency gets cascaded down along the packet processing pipeline. It is noted that, since the organization of the tables (and size of table entries) in HBM 120 is decided by the software run by the processor cores

111 of the multi-processor SoC 110, a static bus width of a segment mapped to a processor prevents this situation from being addressed.

With example embodiments of reconfigurable partitioning of the HBM 120, partitioning of the HBM 120 is dynamic and can be configured and reconfigured based on the needs of the multi-processor SoC 110. The configuration of the multi-processor system 100 to provide HBM bus segments for the processor cores 111, including the mapping of the processor cores 111 to the HBM bus channels 132 of the HBM bus 131 and the operation of groups of HBM bus channels 132 of the HBM bus 131 as independent HBM bus segments for the processor cores 111 at the HBM 120, is dynamic and can be configured and reconfigured in accordance with the needs of the processor cores 111 of the multi-processor SoC 110. In this case, although the HBM bus 131 includes sixteen HBM bus channels 132, each of the processor cores 111 can support four or more (e.g., N=4, N=8, or the like) processor memory channels 112, thereby providing much greater flexibility in supporting various memory access bandwidths by the processor cores 111 based on the current needs of the processor cores 111 (as discussed further with respect to FIGS. 2-4). In other words, rather than the processor cores 111 having processor memory channels 112 that are statically hardwired to the HBM bus channels 132 of the HBM bus 131, the processor cores 111 may support larger numbers of processor memory channels 112 which may be dynamically activated (connected to the HBM bus channels 132 of the HBM bus 131) and deactivated (disconnected from the HBM bus channels 132 of the HBM bus 131) based on the needs of the processor cores 111, respectively, thereby providing greater flexibility in temporarily supporting larger memory access bandwidths by certain processor cores 111 based on the needs of the processor cores 111 (e.g., one or more processor cores 111 effectively "borrows" memory access capacity that would otherwise have been hardwired to other processor cores 111). The multi-processor system 100 may be configured to support reconfigurable partitioning of the HBM 120 by supporting dynamic configuration or programming of the programmable elements, namely, the programmable element 115 of the multi-processor SoC 110 and the programmable element 126 of the HBM 120, to operate subsets of the HBM bus channels 132 of the HBM bus 131 as independent HBM bus segments for the processor cores 111 of the multi-processor SoC 110, respectively. The dynamic configuration or programming of the programmable elements to operate subsets of the HBM bus channels 132 of the HBM bus 131 as independent HBM bus segments for the processor cores 111 of the multi-processor SoC 110, respectively, may be controlled by a control process running on the multi-processor SoC 110 (e.g., a dynamic reconfiguration control process which may be executed by one of the processor cores 111 for which dynamic reconfiguration is performed or by a different processor core (not depicted) of the multi-processor SoC 110). It will be appreciated that the multi-processor system 100 may be configured to support various other capabilities for supporting various example embodiments of reconfigurable partitioning of the HBM 120 for more flexible use of the HBM 120 by the multi-processor SoC 110.

The multi-processor system 100 may be configured to support reconfigurable partitioning of the HBM 120 by supporting dynamic configuration or programming of the programmable elements, namely, the programmable element 115 of the multi-processor SoC 110 and the programmable element 126 of the HBM 120, to operate subsets of the HBM bus channels 132 of the HBM bus 131 as independent HBM bus segments for the processor cores 111 of the multi-processor SoC 110, respectively. The multi-processor system 100 may be configured to support reconfigurable partitioning of the HBM 120 by supporting programming or configuration of the programmable element 115 of the multi-processor SoC 110 to map sets of processor memory channels 112 of the processor cores 111 to sets of HBM bus channels 132 and supporting programming or configuration of the programmable element 126 of the HBM 120 to operate the sets of HBM bus channels 132 as independent HBM bus segments for the processor cores 111, respectively. The multi-processor system 100 may be configured to support reconfigurable partitioning of the HBM 120 by, for each processor core 111 of the multi-processor SoC 110, determining a number of HBM bus channels 132 needed by the processor core 111 and configuring, based on the number of HBM bus channels 132 needed by the processor core 111, the multi-processor system 100 to provide an HBM bus segment for the processor core 111. The configuration of the multi-processor system 100 to provide the HBM bus segment for the processor core 111 may include determining, from the processor memory channels 112 of the processor core 111 based on the number of HBM bus channels 132 to be used by the processor core 111, a set of selected processor memory channels 112 of the processor core 111, determining, from the set of HBM bus channels 132, a set of selected HBM bus channels 132 selected for the processor core 111, and configuring the multi-processor system 100 to support use of the set of selected HBM bus channels 132 selected for the processor core 111 by the set of selected processor memory channels 112 of the processor core 111. The configuration of the multi-processor system 100 to support use of the set of selected HBM bus channels 132 selected for the processor core 111 by the set of selected processor memory channels 112 of the processor core 111 includes configuring the programming element 115 of the multi-processor SoC 110 to support a mapping of the set of selected processor memory channels 112 of the processor core 111 to the set of selected HBM bus channels 132 (e.g., cross-connecting the selected processor memory channels 112 of the processor core 111 to the set of selected HBM bus channels 132) and configuring the programmable element 126 to operate the set of selected HBM bus channels 132 as an independent HBM bus segment for the processor core 111 (e.g., initiating the independent HBM bus segment for the processor core 111 and configuring the selected HBM bus channels 132 as members of the independent HBM bus segment for the processor core 111). It will be appreciated that the operation of the multi-processor system 100 in supporting reconfig-urable partitioning of the HBM 120 may be further under-stood by way of reference to FIGS. 2-4.

It will be appreciated that the multi-processor system 100 may be implemented in various ways and may be utilized within various contexts. For example, the multi-processor system 100 could be a central processing unit (CPU), a graphics processing unit (GPU), a network processing unit (NPU), or the like. For example, the multi-processor system 100 could be implemented within an end user device (e.g., a desktop computer, a laptop computer, a tablet, a smart-phone, a gaming system, or the like), a communication device (e.g., an access device, a router, a switch, or the like), processing device (e.g., a server, a supercomputer, or the like), or the like, as well as various combinations thereof. For example, the multi-processor system 100 may be a single CPU implemented as a multi-core server processor in which the HBM 120 could be configured as the last level cache before reaching traditional DRAM, and each proces-sor core 111 then gets a 2 GB exclusive slice in the cache which can be accessed through four 64-bit channels. For example, the multi-processor system 100 may be a GPU (or a portion thereof, since a GPU can have a very large number of cores) that enables massive parallel computation, such as image processing, cryptocurrency mining, or the like. For example, the multi-processor system 100 may be an NPU that forwards packets in a routing system, where the pro-cessor cores 111 could be daisy-chained to form a packet processing pipeline and the HBM 120 may store various tables looked up for supporting packet processing (e.g., the HBM 120 is partitioned with partitions mapped to processor cores 111 to store tables looked up by the processor cores 111, respectively). It will be appreciated that the multi-processor system 100 could be implemented in various other ways, may be utilized within various other contexts, or the like, as well as various combinations thereof.

Figure 2:
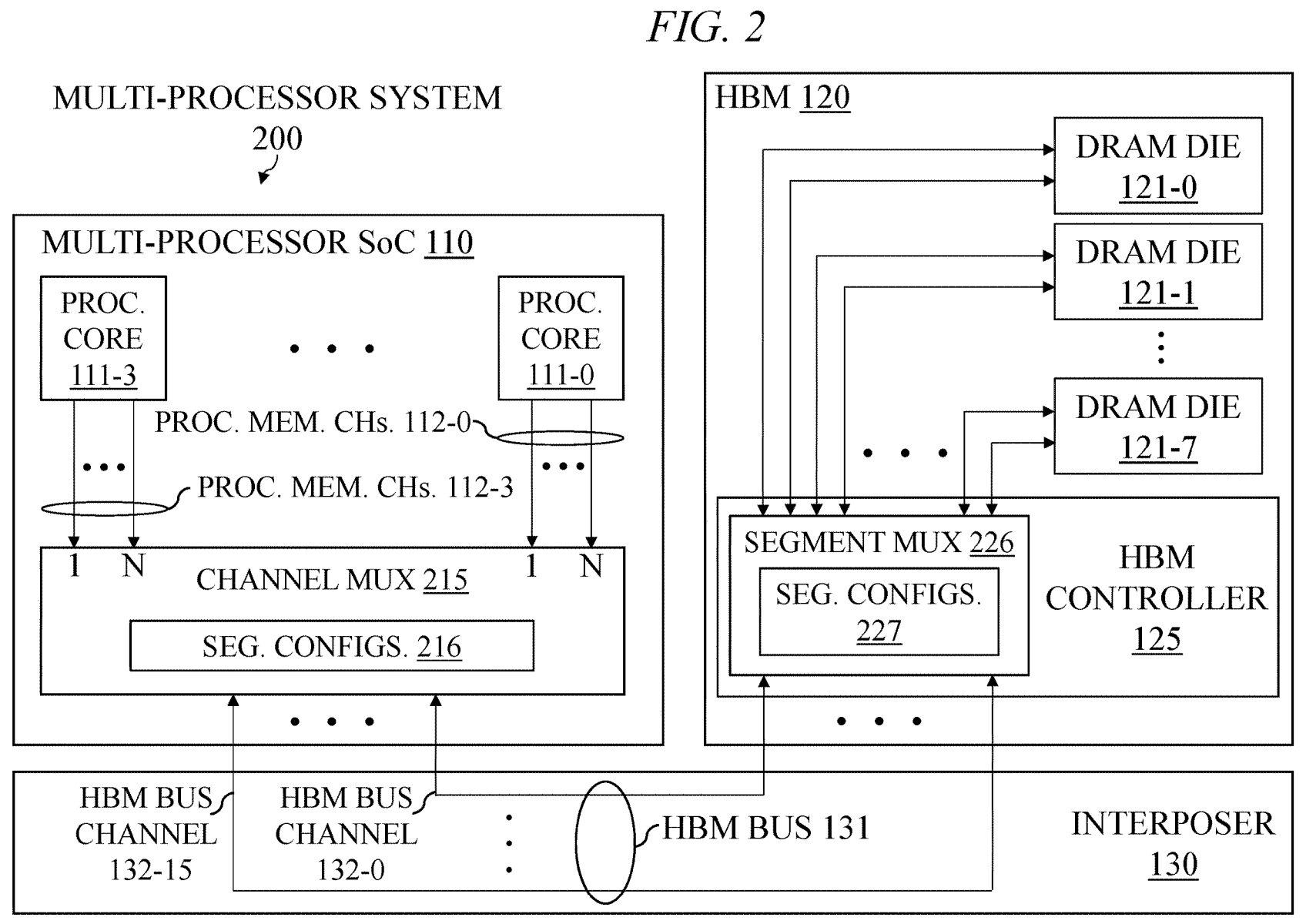

FIG. 2 depicts an example embodiment of the multi-processor system of FIG. 1 where the multi-processor sys-tem includes specific programmable elements which may be configured to support reconfigurable partitioning of HBM to provide independent HBM bus segments for processor cores of the multi-processor SoC.

As illustrated in FIG. 2, the multi-processor system 200 is similar to the multi-processor system 100 of FIG. 1. In the multi-processor system 200, the programmable element 115 of the multi-processor SoC 110 of FIG. 1 is implemented as a channel multiplexer (CMUX) 215 and the programmable element 126 of the HBM controller 125 of the HBM 120 of FIG. 1 is implemented as a segment multiplexer (SMUX) 226. The multi-processor system 200 may be configured to support reconfigurable partitioning of the HBM 120 by supporting programming or configuration of the CMUX 215 of the multi-processor SoC 110 to map sets of processor memory channels 112 of the processor cores 111 to sets of HBM bus channels 132 (e.g., to support cross-connecting of the sets of processor memory channels 112 of the processor cores 111 to sets of HBM bus channels 132) and supporting programming or configuration of the SMUX 226 of the HBM controller 125 of the HBM 120 to operate the sets of HBM bus channels 132 as independent HBM bus segments for the processor cores 111 (e.g., to support instantiation of the independent HBM bus segments for the processor cores 111 and association of the sets of HBM bus channels 132 to the independent HBM bus segments for the processor cores 111), respectively. The multi-processor system 200 may be configured such that software and/or firmware may be used to dynamically reconfigure the CMUX 215 and the SMUX 226 to support reconfigurable partitioning of the HBM 120 such that subsets of the HBM bus channels 132 of the HBM bus 131 may be operated as independent HBM bus segments for the processor cores 111 of the multi-processor SoC 110, respectively.

The CMUX 215 of the multi-processor SoC 110 is configurable to support operation of subsets of the HBM bus channels 132 of the HBM bus 131 as independent HBM bus segments for the processor cores 111 of the multi-processor SoC 110. The CMUX 215 enables flexibility in mapping of the processor memory channels 112 of a processor core 111 to any subset of the HBM bus channels 132 of the HBM bus 131, as the mapping of the processor memory channels 112 of a processor core 111 to a subset of the HBM bus channels 132 of the HBM bus 131 can be changed dynamically under the control of the multi-processor SoC 110 based on the needs of the processor core 111. This enables each of the processor cores 111 to be equipped with the maximum number of processor memory channels 112 that may ever be needed by the processor cores 111 (e.g., N=2, N=4, N=8, N=16, or the like) such that the memory bandwidth needs of the processor core 111 can be met as needed (e.g., using all of the processor memory channels 112 when needed and using only a subset of the processor memory channels 112 if the memory bandwidth needs of the processor core 111 are lower). The CMUX 215 may be programmed through software and/or firmware (e.g., the programming of the CMUX 215 can be done by a processor instruction or can be done through a firmware configuration at the boot time of the multi-processor SoC 110). The CMUX 215 may be programmed by one of the processor cores 111 of the multi-processor SoC 110 or by a separate dedicated control processor of the multi-processor SoC 110 (omitted for purposes of clarity)). The configuration of the CMUX 215 to support operation of subsets of the HBM bus channels 132 of the HBM bus 131 as independent HBM bus segments for the processor cores 111 of the multi-processor SoC 110 is indicated by the segment configurations 216 supported by the CMUX 215. It will be appreciated that the CMUX 215 may be configured to support various other functions for enabling operation of subsets of the HBM bus channels 132 of the HBM bus 131 as independent HBM bus segments for the processor cores 111 of the multi-processor SoC 110.

The SMUX 226 of the HBM 120 is configurable to support operation of subsets of the HBM bus channels 132 of the HBM bus 131 as independent HBM bus segments for the processor cores 111 of the multi-processor SoC 110. The HBM controller 125 needs to be aware that the sets of processor memory channels 112 of the processor cores 111 that are mapped to subsets of the HBM bus channels 132 of the HBM bus 131 by the CMUX 215, respectively, need to be operated as independent HBM bus segments for the processor cores 111. The SMUX 226, which is located within the HBM controller 125, may be configured to operate the subsets of the HBM bus channels 132 of the HBM bus 131 for the sets of processor memory channels 112 of the processor cores 111 as independent HBM bus segments for the processor cores 111, respectively. It is noted that, since the CMUX 115 can be configured dynamically to map the processor memory channels 112 of a processor core 111 to a subset of the HBM bus channels 132 of the HBM bus 131 under the control of the multi-processor SoC 110 based on the needs of the processor core 111, the SMUX 126 also may be configured dynamically under the control of the multi-processor SoC 110 to operate the subset of the HBM bus channels 132 of the HBM bus 131 for the set of processor memory channels 112 of the processor core 111 as an independent HBM bus segment for the processor core 111. The SMUX 226 may be programmed through software and/or firmware (e.g., the programming of the SMUX 226 can be done by a processor instruction or can be done through a firmware configuration at the boot time of the multi-processor SoC 110). The SMUX 226 may be programmed by one of the processor cores 111 of the multi-processor SoC 110 or by a separate dedicated control processor of the multi-processor SoC 110 (omitted for purposes of clarity). The SMUX 226 may be programmed using a control channel from the multi-processor SoC 110 to the HBM 120 (e.g., to the HBM controller 125), where the control channel may be implemented in various ways (e.g., as a Peripheral Component Interconnect Express (PCIe) or other suitable control channel). The configuration of the SMUX 226 to support operation of subsets of the HBM bus channels 132 of the HBM bus 131 as independent HBM bus segments for the processor cores 111 of the multi-processor SoC 110 is indicated by the segment configurations 227 supported by the SMUX 226. It will be appreciated that the SMUX 226 may be configured to support various other functions for enabling operation of subsets of the HBM bus channels 132 of the HBM bus 131 as independent HBM bus segments for the processor cores 111 of the multi-processor SoC 110.

Figure 3:
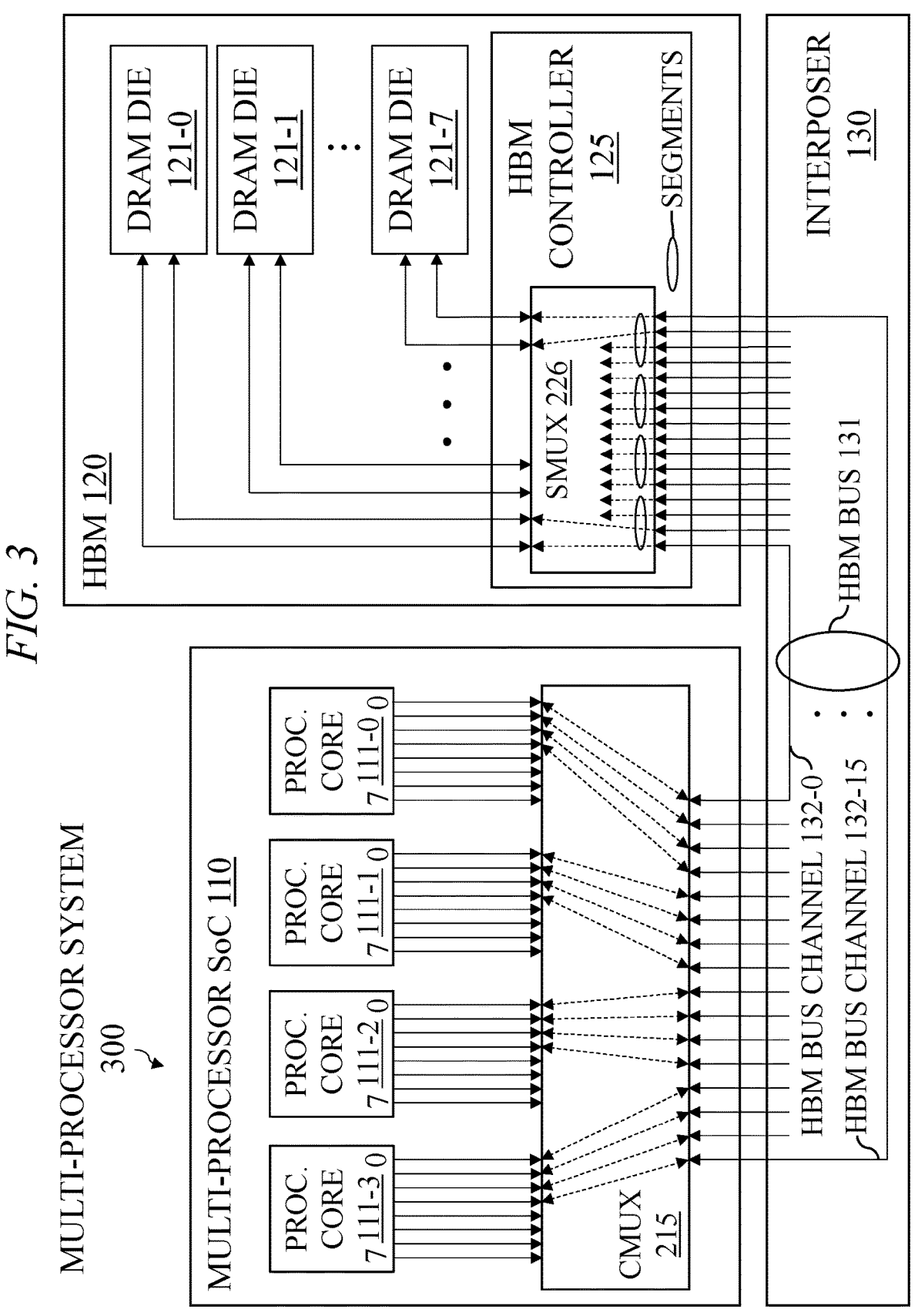
FIG. 3 depicts an example embodiment of use of reconfigurable partitioning of HBM, within the context of the multi-processor system of FIG. 2, where mappings of subsets of the processor memory channels to the HBM bus channels to provide HBM bus segments are homogenous.
Figure 4:
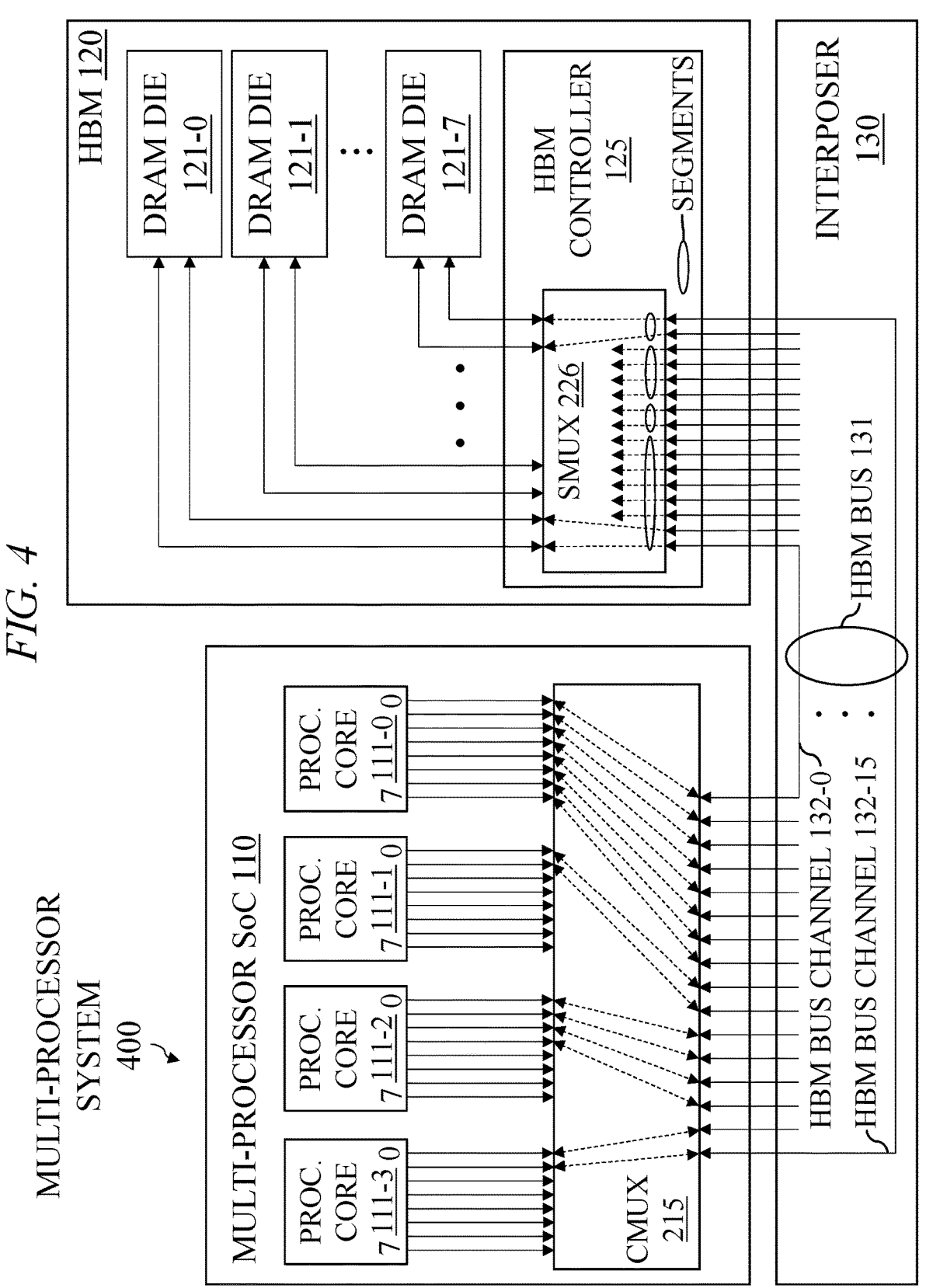
FIG. 4 depicts an example embodiment of use of reconfigurable partitioning of HBM, within the context of the multi-processor system of FIG. 2, where mappings of subsets of the processor memory channels to the HBM bus channels to provide HBM bus segments are heterogeneous.

It will be appreciated that the operation of the multi-processor system 200 of FIG. 2 in supporting reconfigurable partitioning of HBM may be further understood by way of reference to FIGS. 3-4.

FIG. 3 depicts an example embodiment of use of reconfigurable partitioning of HBM, within the context of the multi-processor system of FIG. 2, where mappings of subsets of the processor memory channels to the HBM bus channels to provide HBM bus segments are homogenous.

In FIG. 3, the multi-processor system 300 is configured in a manner similar to the multi-processor system 200 of FIG. 2, and the dynamic mappings of the subsets of the processor memory channels 112 to the HBM bus channels 132 are homogenous (i.e., each of the processor cores 111 is using only a subset of its possible processor memory channels 112, but all of the processor cores 111 are using the same number processor memory channels 112 and associated HBM bus channels 132). This may be used, for example, where each of the processor cores 111 has comparable memory access speed requirements.

In the example of FIG. 3, the programming of the cross-connects, between the processor memory channels 112 of the processor cores 111 and the HBM bus channels 132 of the HBM bus 131, in CMUX 215 is as follows:

Proc-0 memory channels 0-3=>HBM bus channels 0-3
Proc-1 memory channels 0-3=>HBM bus channels 4-7
Proc-2 memory channels 0-3=>HBM bus channels 8-11
Proc-3 memory channels 0-3=>HBM bus channels 12-15

In the example of FIG. 3, the programming of the HBM bus segments in SMUX 226 is as follows:

Segment-0=>HBM bus channels 0-3, DRAM dies 0-1
Segment-1=>HBM bus channels 4-7, DRAM dies 2-3
Segment-2=>HBM bus channels 8-11, DRAM dies 4-5
Segment-3=>HBM bus channels 12-15, DRAM dies 6-7

FIG. 4 depicts an example embodiment of use of reconfigurable partitioning of HBM, within the context of the multi-processor system of FIG. 2, where mappings of subsets of the processor memory channels to the HBM bus channels to provide HBM bus segments are heterogeneous.

In FIG. 4, the multi-processor system 400 is configured in a manner similar to the multi-processor system 200 of FIG. 2, and the dynamic mappings of the subsets of the processor memory channels 112 to the HBM bus channels 132 are heterogeneous (i.e., the processor cores 111 are using different numbers of processor memory channels 112 and associated HBM bus channels 132). This may be used, for example, where the different processor cores 111 have different memory access speed requirements (e.g., one or more HBM bus channels 132 that might otherwise have been provided to a processor core 111 that does not need them can be dynamically remapped to one or more other processor cores 111 which may require the additional memory access bandwidth).

In the example of FIG. 4, assume that a determination is made that Proc-0 needs to have the same memory access speed as the remaining processor cores combined (i.e., Proc-0 needs eight of the HBM bus channels 132) and that Proc-1 and Proc-3 each need only two of the HBM bus channels 132. So, the problem can be solved by heterogeneous bus segment widths across the processor cores 111 and the programming in the CMUX 215 and the SMUX 226 can be dynamically changed to achieve the needed memory access speeds. Namely, two processor memory channels 112 from each of Proc-1 and Proc-3 are deactivated and disconnected from HBM bus channels 132, thereby freeing up four of the HBM bus channels 132 that are then allocated to Proc-0 (in addition to the four HBM bus channels 132 that would normally be allocated to the Proc-0 in the normal homogenous case).

In the example of FIG. 4, the programming of the cross-connects, between the processor memory channels 112 of the processor cores 111 and the HBM bus channels 132 of the HBM bus 131, in CMUX 215 is as follows:

Proc-0 memory channels 0-7=>HBM bus channels 0-7
Proc-1 memory channels 0-1=>HBM bus channels 8-9
Proc-2 memory channels 0-3=>HBM bus channels 10-13
Proc-3 memory channels 0-1=>HBM bus channels 14-15

In the example of FIG. 4, the programming of the HBM bus segments in SMUX 226 is as follows:

Segment-0=>HBM bus channels 0-7, DRAM dies 0-3
Segment-1=>HBM bus channels 8-9, DRAM die 4
Segment-2=>HBM bus channels 10-13, DRAM dies 5-6
Segment-3=>HBM bus channels 14-15, DRAM die 7

Figure 5:
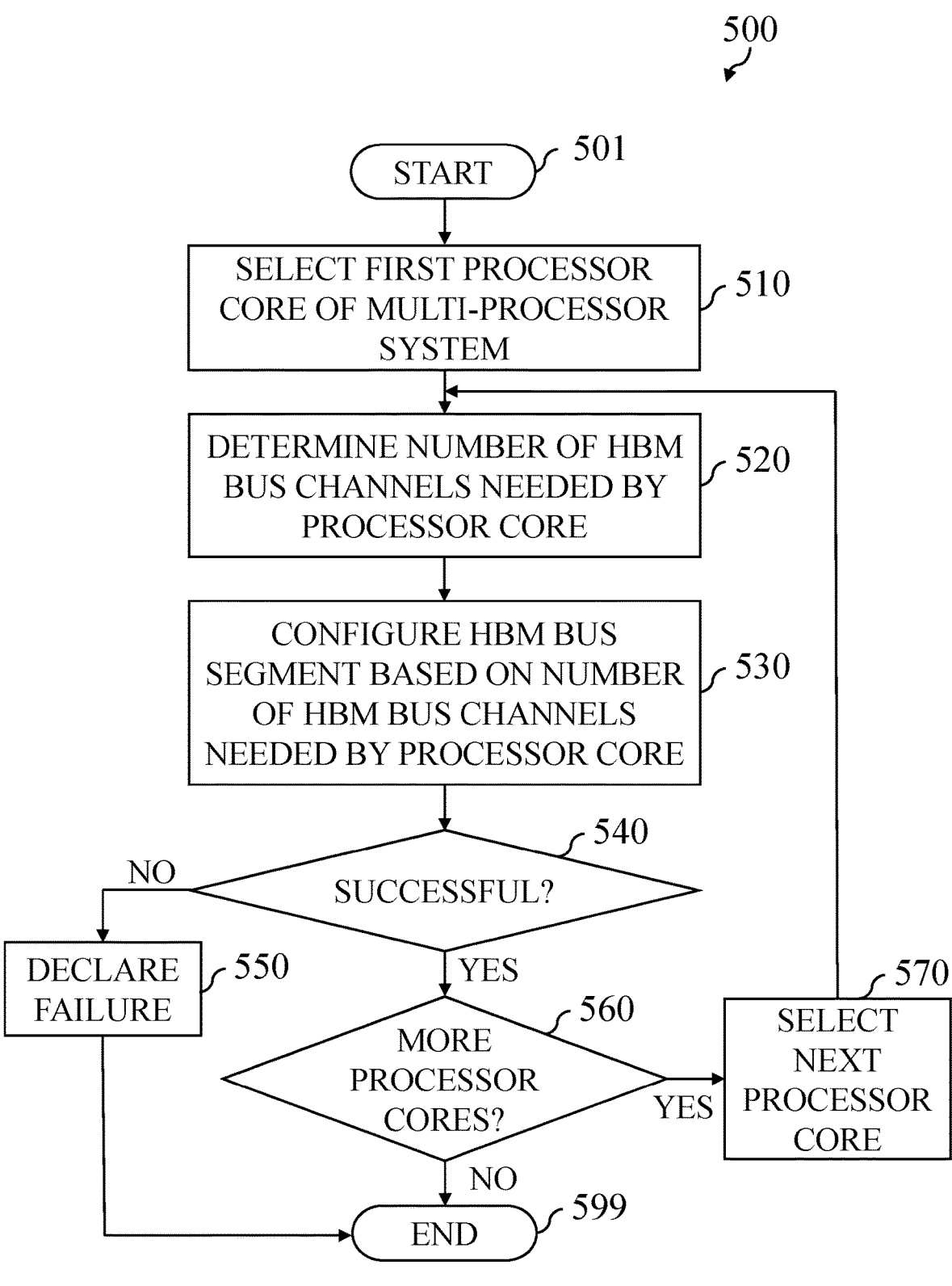
FIG. 5 depicts an example embodiment of a method for use by a multi-processor system for dynamic configuration of HBM bus segments for processor cores of the multi-processor system.

FIG. 5 depicts an example embodiment of a method for use by a multi-processor system for dynamic configuration of HBM bus segments for processor cores of the multi-processor system. It will be appreciated that the method 500 may be implemented in various ways, including by firmware (e.g., firmware loaded into boot ROM, by BIOS, or the like), software (e.g., a software program running in primary many (e.g., RAM) where the HBM is not the primary memory of the multi-processor system), or the like, as well as various combinations thereof. It will be appreciated that, although primarily presented herein as being performed serially, at least a portion of the functions of method 500 may be performed contemporaneously or in a different order than as presented in FIG. 5.

At block 501, the method 500 begins.

At block 510, the first processor core in the multi-processor SoC is selected.

At block 520, the number of HBM bus channels needed by the selected processor core (which may be denoted as Num_Channels) is determined.

At block 530, an HBM bus segment is configured for the selected processor core where the HBM bus segment has a size equal to the number of HBM bus channels needed by the selected processor core.

At block 540, a determination is made as to whether configuration of the HBM bus segment for the processor core was successful. If configuration of the HBM bus segment for the processor core was not successful, then the method 500 proceeds to block 550. If configuration of the HBM bus segment for the processor core was successful, then the method 500 proceeds to block 560.

At block 550, a failure to configure HBM bus segments for the multi-processor system is declared. From block 550, the method 500 proceeds to block 599 where the method 500 ends.

At block 560, a determination is made as to whether the multi-processor system includes more processor cores for which HBM bus segments may need to be configured. If the multi-processor system does include more processor cores for which HBM bus segments may need to be configured, then the method 500 proceeds to block 570. If the multi-processor system does not include more processor cores for which HBM bus segments may need to be configured, then the method 500 proceeds to block 599 where the method 500 ends.

At block 570, a next processor core of the multi-processor system is selected for configuration of an HBM bus segment for the next processor core of the multi-processor system, and then the method 500 returns to block 520 for performing the process for controlling configuration of an HBM bus segment for the next processor core of the multi-processor system.

At block 599, the method 500 ends. It will be appreciated that various other functions described herein with the context of FIGS. 1-4 may be incorporated within the method 500 of FIG. 5.

Figure 6:
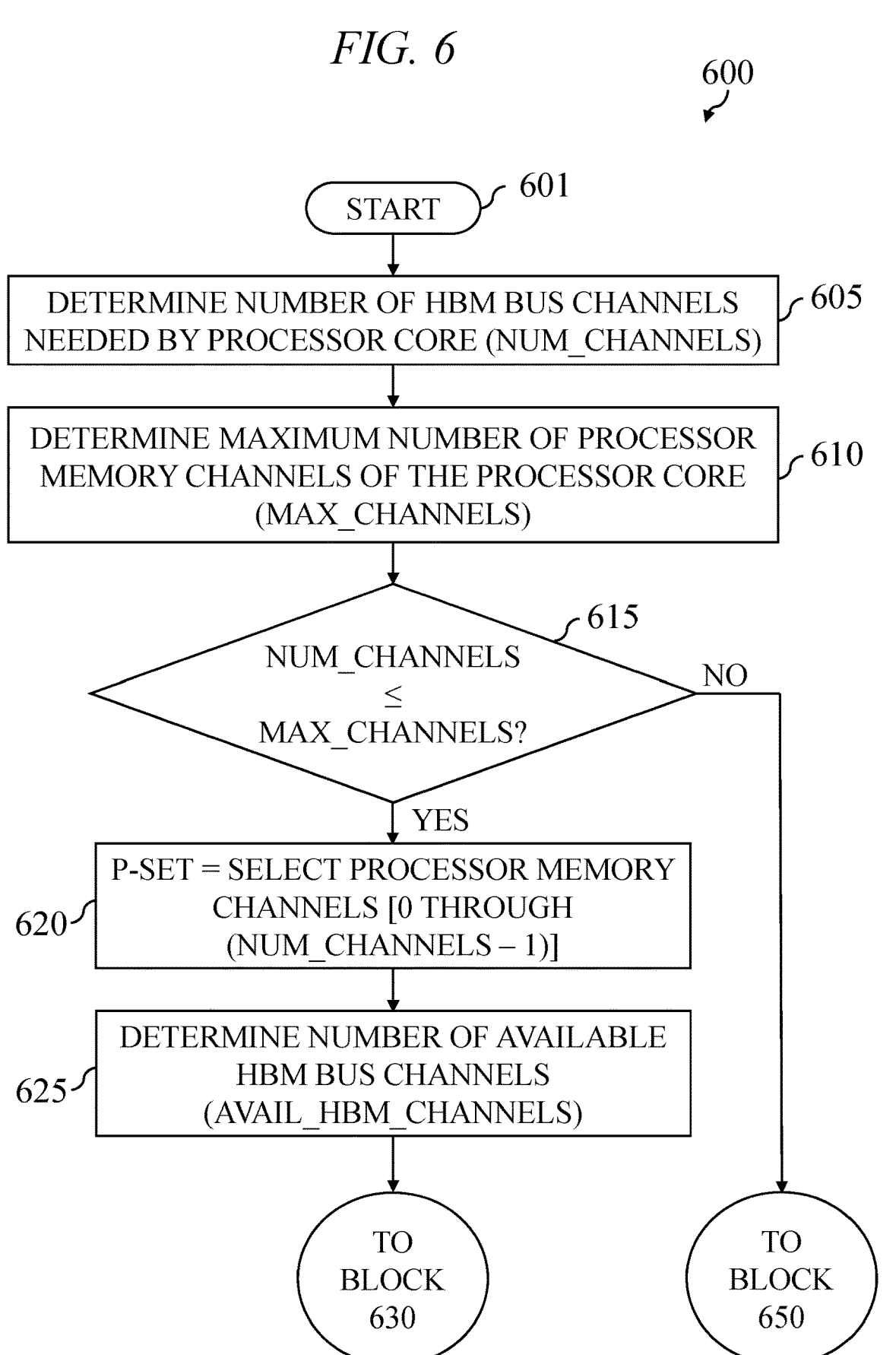
FIG. 6 depicts an example embodiment of a method for use by a multi-processor system for configuration of an HBM bus segment for a processor core of the multi-processor system.
Figure 6:
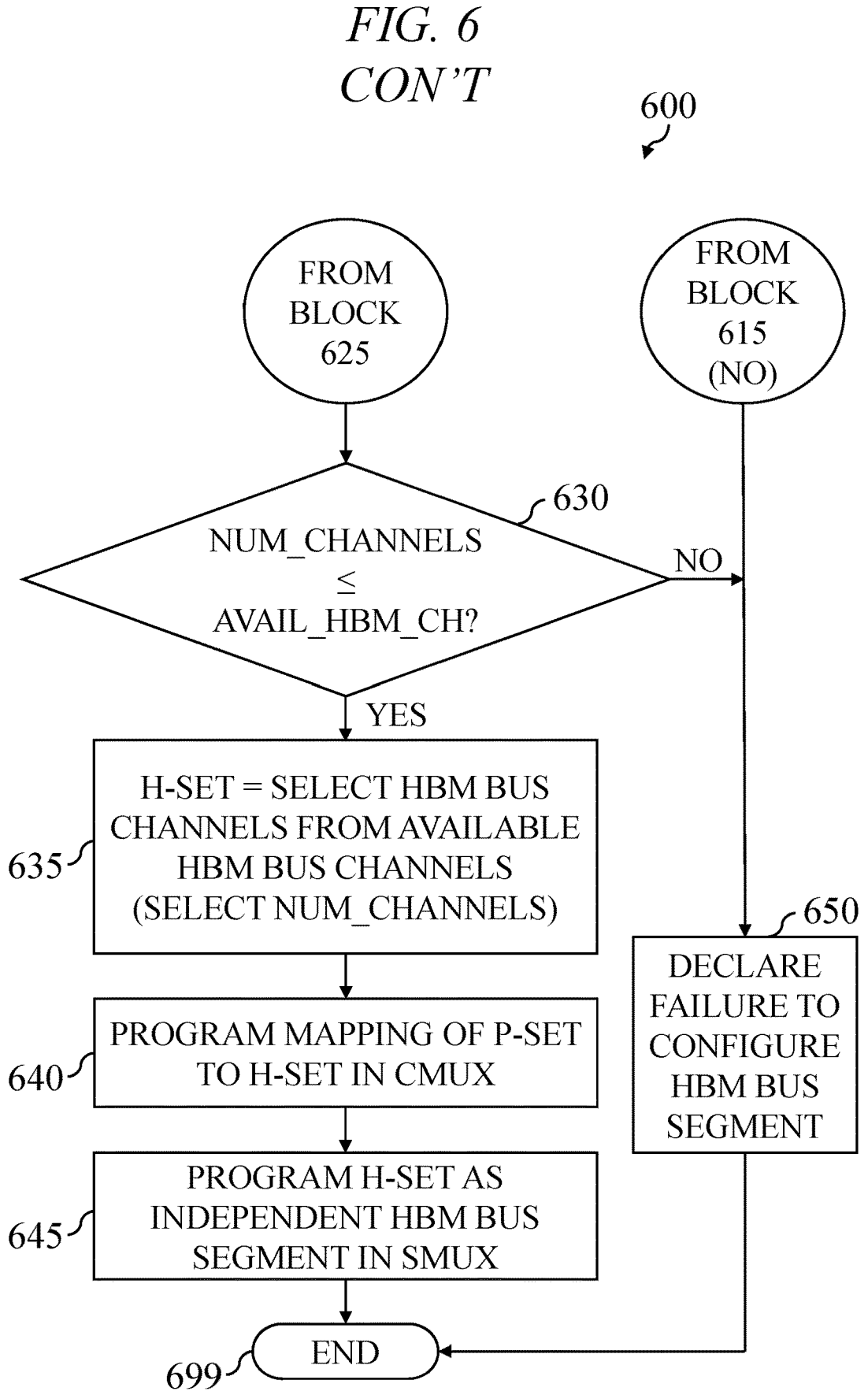

FIG. 6 depicts an example embodiment of a method for use by a multi-processor system for configuration of an HBM bus segment for a processor core of the multi-processor system. It will be appreciated that the method 600 of FIG. 6 may be used to implement the block 530 of FIG. 5 (i.e., the method 600 of FIG. 6 may be executed for each of the processor cores selected in the method 500 of FIG. 5). It will be appreciated that, although primarily presented herein as being performed serially, at least a portion of the functions of method 600 may be performed contemporaneously or in a different order than as presented in FIG. 6.

At block 601, the method 600 begins. It is noted that an input to the method 600 may be an identifier of the selected processor core (which may be denoted as PROCESSOR_ID) for which the HBM bus segment is to be configured.

At block 605, the number of HBM bus channels needed by the selected processor core (which, as previously indicated, may be denoted as Num_Channels) is determined. The number of HBM bus channels needed by the selected processor core may be determined as an input to the method 600 (e.g., within the context of the method 500 where the method 600 is used to implement block 530 of method 500).

At block 610, the maximum number of processor memory channels of the processor core (which may be denoted as Max_Channels) is determined. It will be appreciated that this is the number of processor memory channels physically supported by the processor core.

At block 615, a determination is made as to whether the number of HBM bus channels needed by the selected processor core is less than or equal to the maximum number of processor memory channels of the processor core (Num_Channels≤Max_Channels). If the number of HBM bus channels needed by the selected processor core is less than or equal to the maximum number of processor memory channels of the processor core then the method 600 proceeds to block 620. If the number of HBM bus channels needed by the selected processor core is greater than the maximum number of processor memory channels of the processor core then the method 600 proceeds to block 650.

At block 620, a set of processor memory channels of the selected processor core is selected as the processor memory channels to be used by the selected processor core. For example, selecting the set of processor memory channels to be used by the selected processor core may include selecting the first Num_Channels number of memory channels out of the processor core identified by PROCESSOR_ID to the CMUX (e.g., selecting channels 0 through [Num_Channels-1]), although it will be appreciated that any suitable combination of processor memory channels may be selected as the processor memory channels to be used by the selected processor core. This set is denoted as the P-Set.

At block 625, the number of available HBM bus channels (which may be denoted as Avail_HBM_Channels) is determined. The available HBM bus channels include any HBM bus channels not already allocated to other processor cores.

At block 630, a determination is made as to whether the number of HBM bus channels needed by the selected processor core is less than or equal to the number of available HBM bus channels (Num_Channels≤Avail_HBM_Channels). If the number of HBM bus channels needed by the selected processor core is less than or equal to the number of available HBM bus channels then the method 600 proceeds to block 635. If the number of HBM bus channels needed by the selected processor core is greater than the number of available HBM bus channels then the method 600 proceeds to block 650.

At block 635, a set of HBM bus channels is selected from the available HBM bus channels as the HBM bus channels to be used by the selected processor core (e.g., selecting Num_Channels of the available HBM bus channels to be used as the segment of HBM bus channels, at the SMUX, for the processor core identified by PROCESSOR_ID). It will be appreciated that the set of HBM bus channels selected as the HBM bus channels to be used by the selected processor core may be selected from the available HBM bus channels in various ways. This set is denoted as the H-Set.

At block 640, the mapping of the set of selected processor memory channels to the set of selected HBM bus channels is programmed in the multi-processor system. The mapping is programmed into the CMUX that is configured to cross-connect the selected processor memory channels to the selected HBM bus channels (and this is denoted as programming a mapping of the P-Set to the H-Set in the CMUX). It is noted that an example embodiment of a method for programming the mapping of the set of selected processor memory channels to the set of selected HBM bus channels for the processor core is presented with respect to FIG. 7.

At block 645, the set of selected HBM bus channels is programmed as an independent HBM bus segment in the multi-processor system. The independent HBM bus segment is programmed into the SMUX of the HBM controller on the HBM (and this is denoted as programming the H-Set as an independent HBM bus segment in the SMUX). It is noted that an example embodiment of a method for programming the set of selected HBM bus channels as an independent HBM bus segment for the processor core is presented with respect to FIG. 8. From block 645, the method 600 proceeds to block 699 where the method 600 ends.

At block 650, a failure to configure an HBM bus segment for the processor core is declared. From block 650, the method 600 proceeds to block 699 where the method 600 ends.

At block 699, the method 600 ends.

Figure 7:
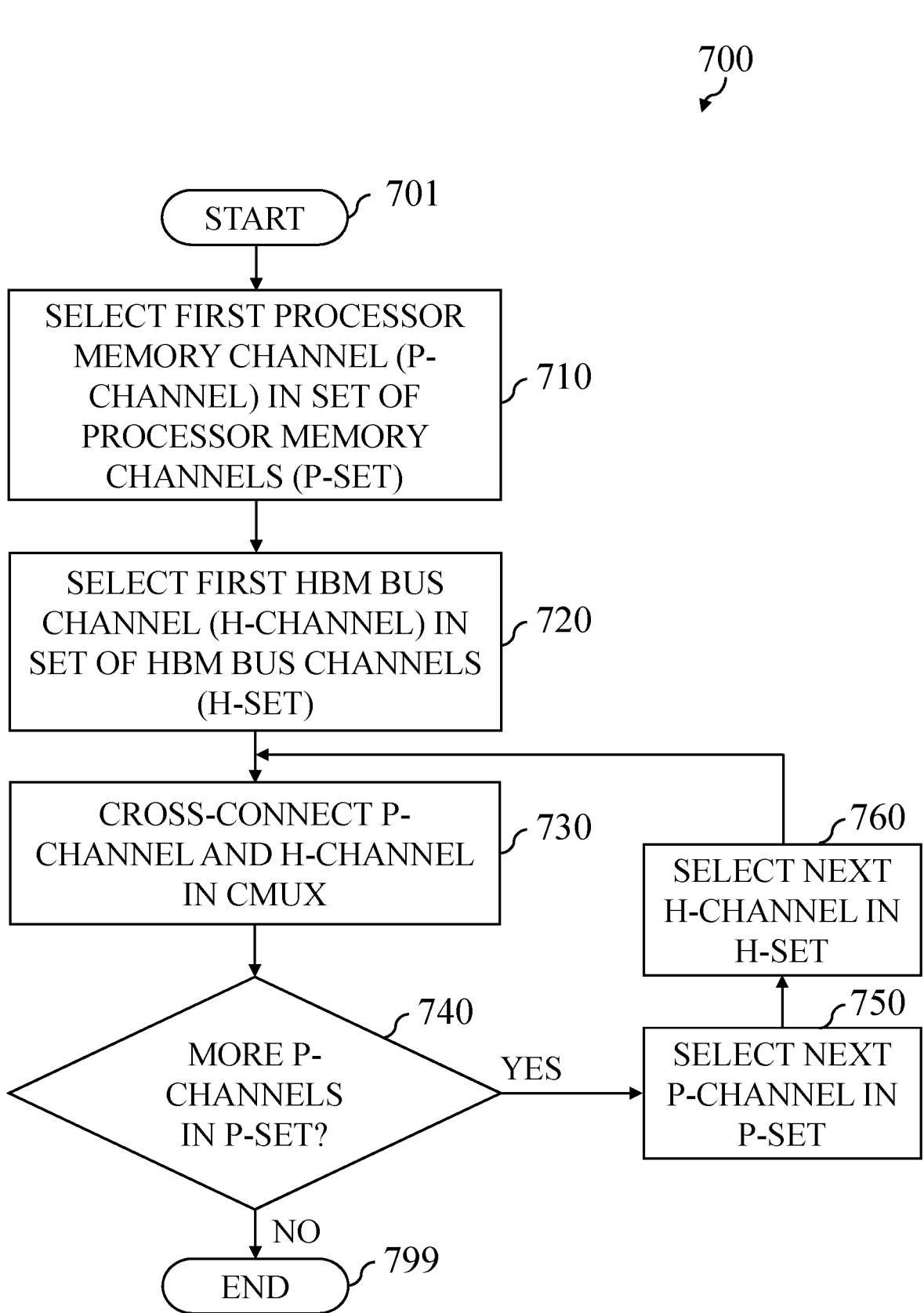
FIG. 7 depicts an example embodiment of a method for use by a multi-processor system for programming the multi-processor system with a mapping of a set of processor memory channels to a set of HBM bus channels for a processor core of the multi-processor system.

FIG. 7 depicts an example embodiment of a method for use by a multi-processor system for programming the multi-processor system with a mapping of a set of processor memory channels to a set of HBM bus channels for a processor core of the multi-processor system. It will be appreciated that the method 700 of FIG. 7 may be used to implement the block 640 of FIG. 6. It will be appreciated that, although primarily presented herein as being performed serially, at least a portion of the functions of method 700 may be performed contemporaneously or in a different order than as presented in FIG. 7.

At block 701, the method 700 begins. It is noted that inputs to the method 700 may include the set of processor memory channels selected for the processor core (i.e., the P-Set) and the set of HBM bus channels selected for the processor core (i.e., the H-Set).

At block 710, a first processor memory channel (P-Channel) in the set of processor memory channels selected for the processor core (P-Set) is selected.

At block 720, a first HBM bus channel (H-Channel) in the set of HBM bus channels selected for the processor core (H-Set) is selected.

At block 730, cross-connect the selected processor memory channel (P-Channel) and the selected HBM bus channel (H-Channel). In other words, the CMUX is programmed to support a cross-connection between the selected processor memory channel (P-Channel) and the selected HBM bus channel (H-Channel).

At block 740, a determination is made as to whether there are additional processor memory channels, in the set of processor memory channels selected for the processor core (P-Set), that have not been cross-connected. If there are more processor memory channels, in the set of processor memory channels selected for the processor core (P-Set), that have not been cross-connected, then the method 700 proceeds to block 750 for selection and cross-connecting of the additional processor memory channels. If there are no more processor memory channels, in the set of processor memory channels selected for the processor core (P-Set), that have not been cross-connected, then the method 700 proceeds to block 799, where the method 700 ends.

At block 750, the next processor memory channel (P-Channel) in the set of processor memory channels selected for the processor core (P-Set) is selected. From block 750, the method 700 proceeds to block 760.

At block 760, the next HBM bus channel (H-Channel) in the set of HBM bus channels selected for the processor core (H-Set) is selected. From block 760, the method 700 returns to block 730 for cross-connecting the next selected processor memory channel (P-Channel) and the next selected HBM bus channel (H-Channel).

At block 799, the method 700 ends.

Figure 8:
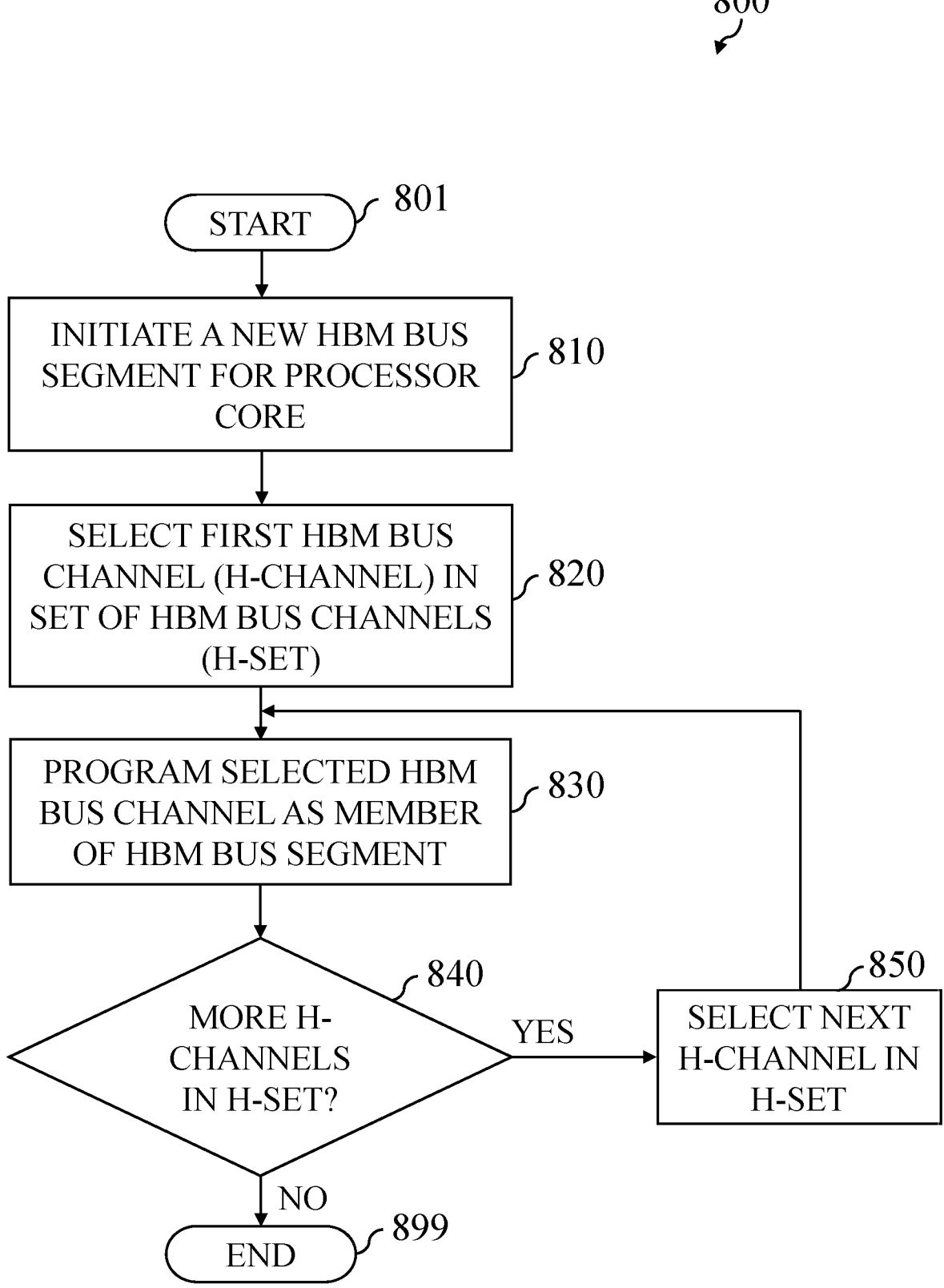
FIG. 8 depicts an example embodiment of a method for use by a multi-processor system for programming the multi-processor system to operate a set of HBM bus channels as an independent HBM bus segment for a processor core of the multi-processor system.

FIG. 8 depicts an example embodiment of a method for use by a multi-processor system for programming the multi-processor system to operate a set of HBM bus channels as an independent HBM bus segment for a processor core of the multi-processor system. It will be appreciated that the method 800 of FIG. 8 may be used to implement the block 645 of FIG. 6. It will be appreciated that, although primarily presented herein as being performed serially, at least a portion of the functions of method 800 may be performed contemporaneously or in a different order than as presented in FIG. 8.

At block 801, the method 800 begins. It is noted that input to the method 800 may include the set of HBM bus channels selected for the processor core (i.e., the H-Set).

At block 810, a new HBM bus segment is instantiated for the processor core. This is the HBM bus segment that will enable the set of HBM bus channels selected for the processor core (i.e., the H-Set) to be operated as an independent HBM bus segment of the HBM memory.

At block 820, a first HBM bus channel (H-Channel) in the set of HBM bus channels selected for the processor core (H-Set) is selected.

At block 830, the selected HBM bus channel (H-Channel) is programmed as a member of the HBM bus segment. In other words, the SMUX is programmed to support operation of the selected HBM bus channel (H-Channel) as part of the HBM bus segment of the HBM memory for the processor core.

At block 840, a determination is made as to whether there are additional HBM bus channels, in the set of HBM bus channels (H-Set), that have not been associated with the HBM bus segment for the processor core. If there are more HBM bus channels, in the set of HBM bus channels selected for the processor core (H-Set), that have not been associated with the HBM bus segment, then the method 800 proceeds to block 850 for selection and programming of the additional HBM bus channels. If there are no more HBM bus channels, in the set of HBM bus channels selected for the processor core (H-Set), that have not been programmed as a member of the HBM bus segment, then the method 700 proceeds to block 799, where the method 700 ends.

At block 850, the next HBM bus channel (H-Channel) in the set of HBM bus channels selected for the processor core (H-Set) is selected. From block 850, the method 800 returns to block 830 for programming the next selected HBM bus channel (H-Channel) as a member of the HBM bus segment of the HBM memory for the processor core.

At block 899, the method 800 ends.

FIG. 9 depicts an example embodiment of a method for use by a multi-processor system for dynamic configuration of HBM bus segments for processor cores of the multi-processor system. It will be appreciated that, although primarily presented herein as being performed serially, at least a portion of the functions of method 900 may be performed contemporaneously or in a different order than as presented in FIG. 9.

At block 901, the method 900 begins.

At block 910, determine, for a multi-processor system including a processor core and a high bandwidth memory supporting a high bandwidth memory bus having a set of high bandwidth memory bus channels, a number of the high bandwidth memory bus channels to be used by the processor core.

At block 920, configure, based on the number of the high bandwidth memory bus channels to be used by the processor core, the multi-processor system to provide a high bandwidth memory bus segment for the processor core.

At block 999, the method 900 ends.

Figure 10:
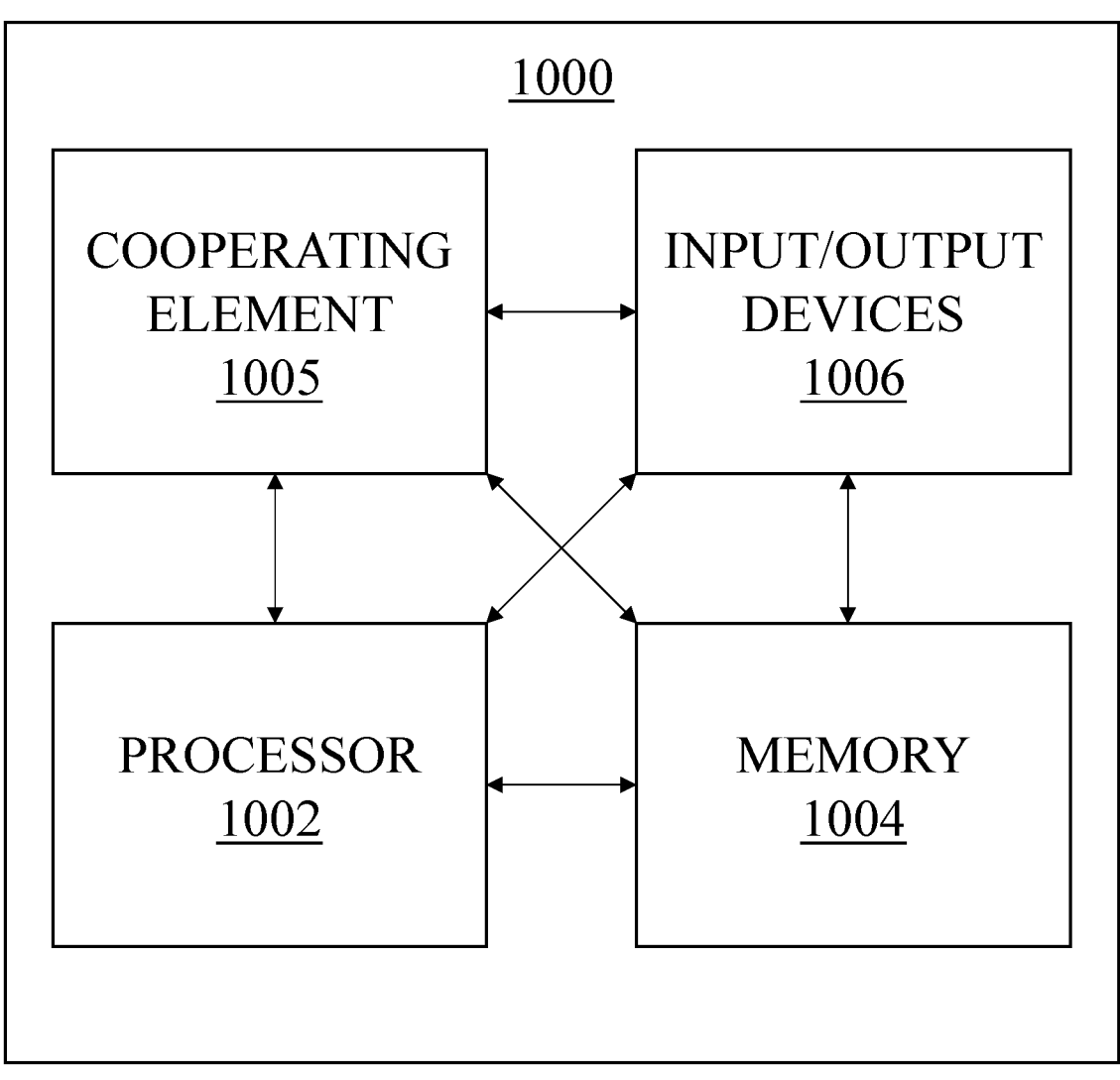
FIG. 10 depicts an example embodiment of a computer suitable for use in performing various functions presented herein.

FIG. 10 depicts an example embodiment of a computer suitable for use in performing various functions presented herein.

The computer 1000 includes a processor 1002 (e.g., a central processing unit (CPU), a graphics processing unit (GPU), a network processing unit (NPU), a processor, a processor core of a processor, a subset of processor cores of a processor, a set of processor cores of a processor, or the like) and a memory 1004 (e.g., a random access memory (RAM), a read-only memory (ROM), or the like). In at least some example embodiments, the computer 1000 may include at least one processor and at least one memory storing instructions that, when executed by the at least one processor, cause the computer to perform various functions presented herein.

The computer 1000 also may include a cooperating element 1005. The cooperating element 1005 may be a hardware device. The cooperating element 1005 may include firmware. The cooperating element 1005 may be a process that can be loaded into the memory 1004 and executed by the processor 1002 to implement various functions presented herein (in which case, for example, the cooperating element 1005 (including associated data structures) can be stored on a non-transitory computer readable medium, such as a storage device or other suitable type of storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements described herein, or the like, as well as various combinations thereof. For example, computer 1000 may provide a general architecture and functionality that is suitable for implementing one or more elements presented herein or may provide a general architecture and functionality within which one or more elements presented herein may be utilized.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions which, when executed by the at least one processor, cause the apparatus at least to:
       determine, for a multi-processor system including a processor core and a high bandwidth memory supporting a high bandwidth memory bus having a set of high bandwidth memory bus channels, a number of the high bandwidth memory bus channels to be used by the processor core; and configure, based on the number of the high bandwidth memory bus channels to be used by the processor core, the multi-processor system to provide a high bandwidth memory bus segment for the processor core, wherein, to configure the multi-processor system to provide the high bandwidth memory bus segment for the processor core, the instructions, when executed by the at least one processor, cause the apparatus at least to:

determine, from a set of processor memory channels of the processor core based on the number of high bandwidth memory bus channels to be used by the processor core, a set of selected processor memory channels of the processor core;

determine, from the set of high bandwidth memory bus channels, a set of selected high bandwidth memory bus channels selected for the processor core; and configure the multi-processor system to support use of the set of selected high bandwidth memory bus channels selected for the processor core by the set of selected processor memory channels of the processor core.

2. The apparatus of claim 1, wherein, to configure the multi-processor system to support use of the set of selected high bandwidth memory bus channels selected for the processor core by the set of selected processor memory channels of the processor core, the instructions, when executed by the at least one processor, cause the apparatus at least to:

configure a first element to support a mapping of the set of selected processor memory channels of the processor core to the set of selected high bandwidth memory bus channels; and configure a second element to operate the set of selected high bandwidth memory bus channels as an independent high bandwidth memory bus segment for the processor core.

3. The apparatus of claim 2, wherein, to configure the first element to support the mapping of the set of selected processor memory channels of the processor core to the set of selected high bandwidth memory bus channels, the instructions, when executed by the at least one processor, cause the apparatus at least to:

configure the first element to cross-connect, respectively, the selected processor memory channels of the processor core and the selected high bandwidth memory bus channels.

4. The apparatus of claim 2, wherein, to configure the second element to operate the set of selected high bandwidth memory bus channels as the independent high bandwidth memory bus segment for the processor core, the instructions, when executed by the at least one processor, cause the apparatus at least to:

instantiate, at the second element, the independent high bandwidth memory bus segment for the processor core; and configure, at the second element, the selected high bandwidth memory bus channels as members of the independent high bandwidth memory bus segment for the processor core.

5. A method, comprising:

determining, for a multi-processor system including a processor core and a high bandwidth memory supporting a high bandwidth memory bus having a set of high bandwidth memory bus channels, a number of the high bandwidth memory bus channels to be used by the processor core; and configuring, based on the number of the high bandwidth memory bus channels to be used by the processor core, the multi-processor system to provide a high bandwidth memory bus segment for the processor core, wherein configuring the multi-processor system to provide the high bandwidth memory bus segment for the processor core includes:

determining, from a set of processor memory channels of the processor core based on the number of high bandwidth memory bus channels to be used by the processor core, a set of selected processor memory channels of the processor core;

determining, from the set of high bandwidth memory bus channels, a set of selected high bandwidth memory bus channels selected for the processor core; and configuring the multi-processor system to support use of the set of selected high bandwidth memory bus channels selected for the processor core by the set of selected processor memory channels of the processor core.

6. The method of claim 5, wherein configuring the multi-processor system to support use of the set of selected high bandwidth memory bus channels selected for the processor core by the set of selected processor memory channels of the processor core includes:

configuring a first element to support a mapping of the set of selected processor memory channels of the processor core to the set of selected high bandwidth memory bus channels; and configuring a second element to operate the set of selected high bandwidth memory bus channels as an independent high bandwidth memory bus segment for the processor core.

7. The method of claim 6, wherein configuring the first element to support the mapping of the set of selected processor memory channels of the processor core to the set of selected high bandwidth memory bus channels includes:

configuring the first element to cross-connect, respectively, the selected processor memory channels of the processor core and the selected high bandwidth memory bus channels.

8. The method of claim 6, wherein configuring the second element to operate the set of selected high bandwidth memory bus channels as the independent high bandwidth memory bus segment for the processor core includes:

instantiating, at the second element, the independent high bandwidth memory bus segment for the processor core; and configuring, at the second element, the selected high bandwidth memory bus channels as members of the independent high bandwidth memory bus segment for the processor core.

* * * * *